United States Patent [19]

Matsuzaki et al.

[11] Patent Number: 5,767,848
[45] Date of Patent: Jun. 16, 1998

[54] DEVELOPMENT SUPPORT SYSTEM

[75] Inventors: Kichie Matsuzaki; Keiichi Okamoto; Hideaki Suzuki; Hiroshi Makita; Hisashi Onari, all of Yokohama; Toshijiro Ohashi, Chigasaki; Mitsuharu Hayakawa, Kounosu; Roberto Kishikawa, Fujisawa; Hiroshi Kitazawa, Shimizu, all of Japan

[73] Assignee: Hitachi, Ltd., Tokyo, Japan

[21] Appl. No.: 354,640

[22] Filed: Dec. 13, 1994

[51] Int. Cl.$^6$ .......................................... G06F 9/22
[52] U.S. Cl. .......................... 345/331; 345/330
[58] Field of Search .................... 395/352, 353, 395/354, 117, 149, 326, 329, 330, 331; 358/200

[56] References Cited

U.S. PATENT DOCUMENTS

| | | | |
|---|---|---|---|
| 5,367,619 | 11/1994 | Dipaolo et al. | 395/342 |
| 5,384,910 | 1/1995 | Torres | 395/346 |
| 5,388,165 | 2/1995 | Deatin et al. | 382/7 |
| 5,442,788 | 8/1995 | Bier | 395/650 |
| 5,491,783 | 2/1996 | Douglas et al. | 395/159 |
| 5,535,321 | 7/1996 | Massaro et al. | 395/342 |
| 5,539,870 | 7/1996 | Conrad et al. | 395/330 |
| 5,542,024 | 7/1996 | Balint et al. | 395/342 |
| 5,555,370 | 9/1996 | Li et al. | 395/344 |

Primary Examiner—Raymond J. Bayerl
Assistant Examiner—Steven P. Sax
Attorney, Agent, or Firm—Antonelli, Terry, Stout, & Kraus, LLP

[57] ABSTRACT

A development support system for supporting new product development activities including designing, manufacturing experimental models and testing the functions of the experimental models and for providing an environment for the cooperative activities of a plurality of members of a development project team has a model storage for storing product models, resource models of resources to be used for product development and product development activity models; a target storage for storing target values of schedules of product development, and the cost and the performance of the product; an estimating unit for estimating schedules of product development and the cost and the performance of the product on the basis of the models stored in the model storage; a support unit for support the operations of the members of the development project team for making reference to the models, the target values and the estimated values, and changing and particularizing the models, the target values and the estimated values; a notifying unit for deciding, when each model is changed or particularized, whether or not the estimated values meet the corresponding target values and, when the estimated values do not meet the corresponding target values, for notifying the members of the development project team to that effects; and a unit for monitoring electronic mail necessary for carrying out tasks essential to the development of the product, extracting information relating to the progress of tasks essential to carrying out the development of the product, and providing the members of the development project team with information about the progress of the tasks.

25 Claims, 30 Drawing Sheets

$$\text{INDEX 1} = \left(\frac{\text{NUMBER OF ALL THE TASKS}}{\text{NUMBER OF FINISHED TASKS}} - 1\right) \times \text{SPENT MANHOUR}$$

$$\text{INDEX 2} = \left(\frac{\text{NUMBER OF PROBLEMS}}{\text{NUMBER OF SOLVED PROBLEMS}} - 1\right) \times \text{SPENT MANHOUR}$$

OPERATION: COPY TASK B

OPERATION: DELAY TASK B TWO DAYS

FIG. 13

TASK 1
TASK 2
TASK 3
TASK 4

| PROBLEM | ACTION | DESIGN CHANGE SCHEDULE | DESIGN CHANGE COMPLETION | DESIRED MODIFICATION SCHEDULE | MODIFICATION SCHEDULE | MODIFICATION COMPLETION | DESIRED TEST SCHEDULE |
|---------|--------|------------------------|--------------------------|-------------------------------|----------------------|------------------------|-----------------------|
|         |        | 94/9/2                 | 94/9/3                   | 94/9/3                        | 94/9/3               | 94/9/5                 | 94/9/6                |
|         |        |                        |                          |                               |                      |                        |                       |
|         |        |                        |                          |                               |                      |                        |                       |
|         | 1302   | 1303                   | 1304                     | 1305                          | 1306                 | 1307                   | 1308                  |

1301

TASK 12
TASK 13
TASK 14

FIG. 16(1)
DATE AND TIME DISPLAY

| PART NAME | PLOTTING | | CONDITION OF PROGRESS (1/25) | | | | | |
| --- | --- | --- | --- | --- | --- | --- | --- | --- |
| | | | ESTIMATION | | ORDER ARRANGEMENT | | TRIAL MANUFACTURE | |
| | START | COMPLETION | REQUEST | REPLY | ORDER | DELIVERY | ORDER | ACHIEVEMENT |
| CABINET | 1/4 | 1/15 | 1/15 | | | | | |
| CONTROL SUBSTRATE | 1/5 | 1/14 | 1/14 | 1/21 | 1/22 | | | |
| REINFORCEMENT | 1/8 | 1/10 | 1/11 | 1/15 | 1/16 | | | |
| POWER SUPPLY | 1/8 | 1/20 | 1/21 | | | | | |
| PIPE | 1/10 | | | | | | | |

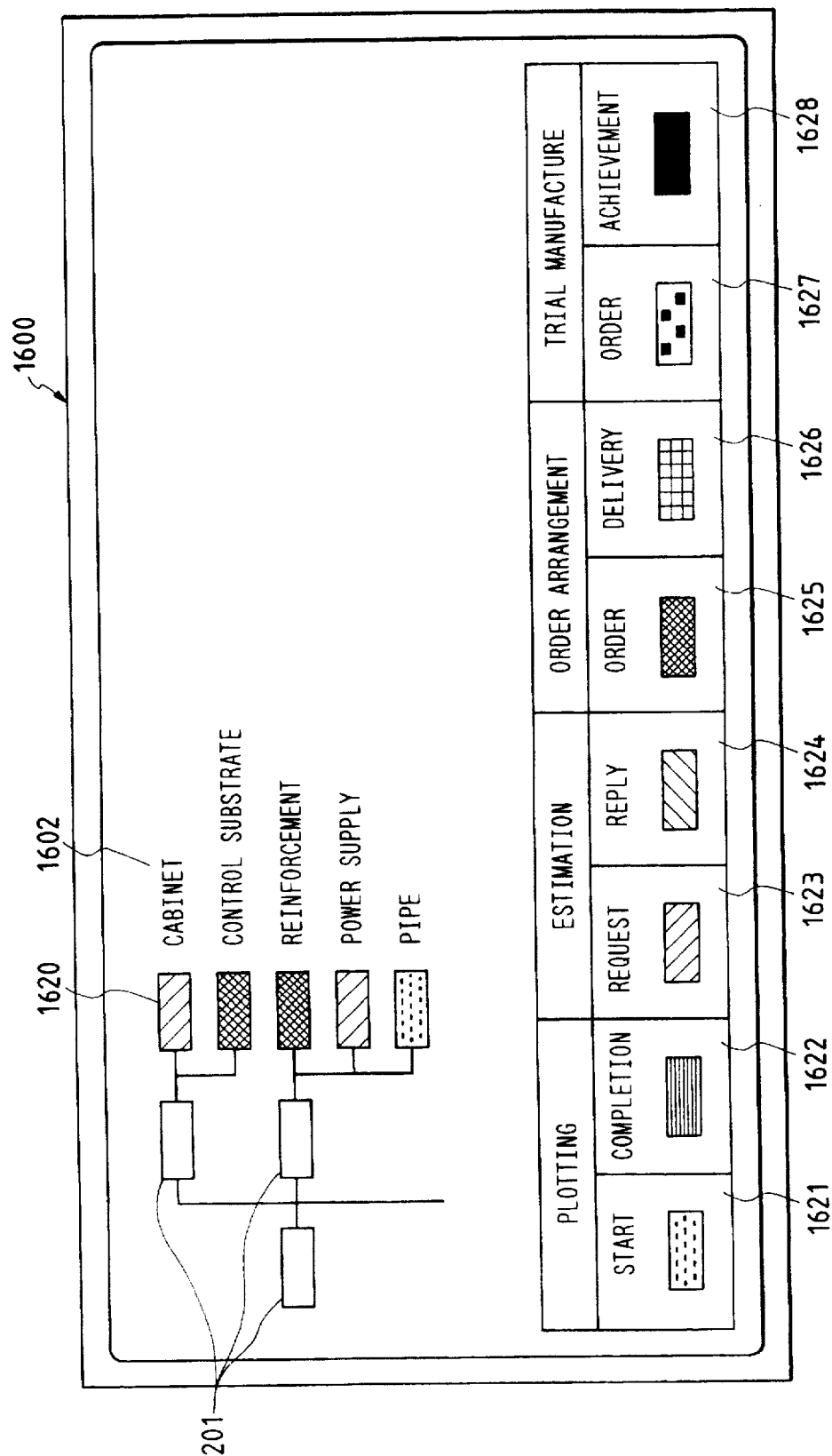

FIG. 19

| (CATEGORY) | (DATE) | (CONTENT ATTRIBUTE) | | |
|---|---|---|---|---|
| 210 — DESIGN CHANGE INSTRUCTION | DATE | NEW DRAWING NUMBER | | |
| 211 — ESTIMATION REQUEST | DATE | ESTIMATION DRAWING NUMBER | | |
| 212 — ESTIMATION | DATE | ESTIMATION REQUEST NUMBER | ESTIMATION | |
| 213 — ARRANGEMENT INSTRUCTION | DATE | ISSUED DRAWING NUMBER | | |
| 214 — DELIVERY REGISTRATION | DATE | INSTRUCTION NUMBER | | |
| 215 — TRIAL MANUFACTURE INSTRUCTION | DATE | OBJECT MACHINE TYPE | | |
| 216 — ACHIEVEMENT REGISTRATION | DATE | TRIAL MANUFACTURE INSTRUCTION NUMBER | COMPLETED ITEMS | |
| 2111 — PRACTICE OF CHARACTERISTIC CALCULATION | DATE | OBJECT MACHINE TYPE | STRUCTURE SPECIFICATIONS | CALCULATING CONDITIONS |
| 2112 — RESULT OF CHARACTERISTIC CALCULATION | DATE | CHARACTERISTIC CALCULATION EXECUTION NUMBER | RESULT OF CALCULATION | |
| 2113 — CHARACTERISTIC EXPERIMENT INSTRUCTION | DATE | OBJECT MACHINE TYPE | STRUCTURE SPECIFICATIONS | EXPERIMENTAL CONDITIONS |
| 2114 — REPORT ON RESULT OF EXPERIMENT | DATE | CHARACTERISTIC EXPERIMENT INSTRUCTION NUMBER | RESULT OF EXPERIMENT | |

FIG. 24

| PART NAME | PLOTTING | | ESTIMATION | | SET SCHEDULE (12/25) | | | |
| --- | --- | --- | --- | --- | --- | --- | --- | --- |
| | | | | | ORDER ARRANGEMENT | | TRIAL MANUFACTURE | |
| | START | COMPLETION | REQUEST | REPLY | INSTRUC-TION | DELIVERY | INSTRUC-TION | ACHIEVEMENT |
| CABINET | 1/5 | 1/16 | 1/16 | 1/20 | 1/21 | 2/21 | 2/23 | 3/23 |
| CONTROL SUBSTRATE | 1/6 | 1/15 | 1/15 | 1/20 | 1/21 | 2/21 | 2/23 | 3/23 |
| REINFORCEMENT | 1/9 | 1/11 | 1/12 | 1/14 | 1/15 | 2/15 | 2/17 | 3/17 |
| POWER SUPPLY | 1/9 | 1/21 | 1/22 | 1/25 | 1/26 | 2/26 | 2/28 | 3/28 |
| PIPE | 1/11 | 1/21 | 1/22 | 1/25 | 1/26 | 2/26 | 2/28 | 3/28 |

SCHEDULE SETTING

PROGRESS REFERENCE BOTTOM

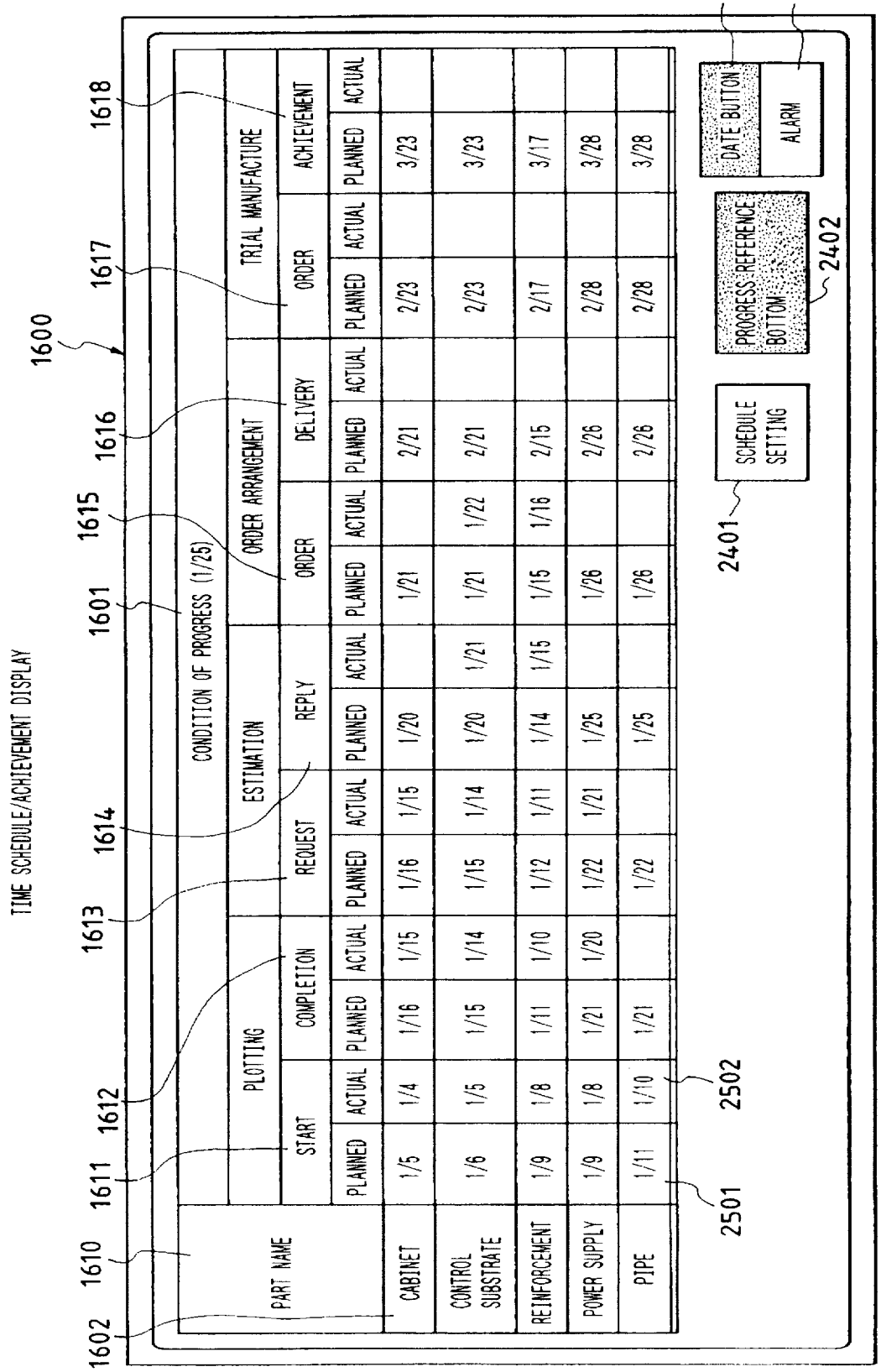

GRAPHICAL DISPLAY

FIG. 27

| SUZUKI (NAME) | SATO (NAME) | TANAKA | TAKAHASHI |

| NAME OF TESTING LABOLATORY : PLANT 1 | | MESSAGE | TIME |
|---|---|---|---|
| DATE | 1994/9/2 | MOTOR GENERATES EXCESSIVELY LARGE NOISE | 9:30:20 |
| STARTING TIME | 9:00:00 | | |
| TEMPERATURE | 25.6°C | | |
| HUMIDITY | 75% | | |
| CONDITION 1 | CONDITION 1 | | |
| CONDITION 2 | CONDITION 2 | | |

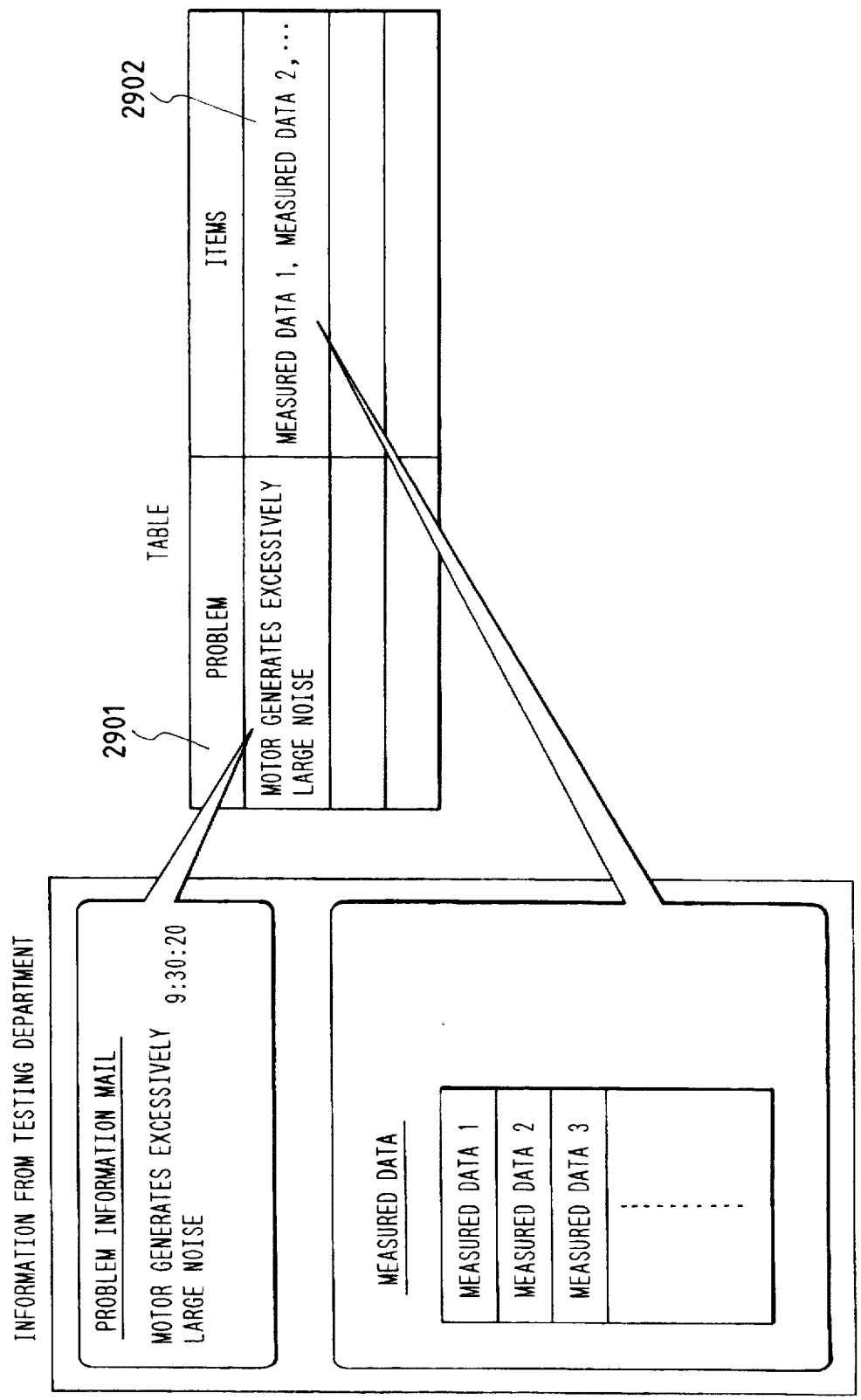

DEVELOPMENT SUPPORT SYSTEM

BACKGROUND OF THE INVENTION

The present invention relates to a development support system to be used for developing a new product by enterprises and factories and, more particularly, to a development support system that provides an environment for the cooperative activities of a plurality of persons participating in a development project.

A development support system for supporting the cooperative work of a plurality of persons is disclosed in, for example, Japanese Patent Laid-open (Kokai) No. 3-250365. This support system enables a plurality of members of a task group stationed at separate places to hold a conference at every stage of cooperative work using a plurality of information processors for exchanging information about their individual achievements and proceeding their work with the information obtained in the conference.

A development management system disclosed in Japanese Patent Laid-open (Kokai) No. 4-364529 enables a plurality of members of a software development task group to manage the software development activities by exchanging electronic mails containing information about the contents of module development, such as command codes, projects, work codes, work data, requesters, destinations of request and priority, and development management information. Since this development management system uses electronic mails, information about development activities can be sent to the members regardless of the members' circumstances, and the development management need not use any printed matters, such as documents.

Incidentally, when carrying out a development project planned to develop a new product, the general target value of the development project, the estimated progress of the development project, the target values of every task of the development work and the estimated progress of the divisions of the development work must be coordinated at stages of the development project.

When the aforesaid known development support system is employed to support the cooperative work and information is merely exchanged between the members, the individual members must manage the information for coordination and, consequently, load on the members, i.e., the users of the development support system, for management work to achieve the targets of the performance and the cost of the product and development schedule cannot be reduced satisfactorily. This known development support system is thus incapable of satisfactorily supporting management work for coordinating the general target or the individual targets of the development project and the expected progress of the development project.

The aforesaid known development management system requires exchanging electronic mails for development management and development management cannot be achieved at all without exchanging electronic mails. Furthermore, the development management system is incapable of checking electronic mails to see whether or not the contents of the electronic mails represent the actual condition of the progress of the development activities.

SUMMARY OF THE INVENTION

A first object of the present invention is to provide a development support system capable of supporting management work on coordinating the general target and individual targets of a new product development project and estimated data representing the progress of the new product development project.

A second object of the present invention is to provide a development progress monitoring means capable of objectively monitoring the progress of a development project without requiring exchanging electronic mails for development management and without imposing a burden on the users.

For achieving the first object, the present invention provides a development support system for supporting the product development activities of a plurality of members of a development project team, comprising:

a model storage means for storing product models, resource models to be used for product development, and product development activity models;

a target storage means for storing the general and the individual target values for the cost and the performance of the product, and development schedules;

an estimating means for estimating the cost, the performance, and the progress of the development schedules on the basis of the foregoing models stored in the model storage means;

a reference support means for supporting the members of the development project team to make reference to the models, the target values and the estimated data of progress;

a support means for supporting the members of the development project team for operations to change and particularize the models; and a notifying means for deciding whether or not the estimated data of progress meet the corresponding target values when the models are changed or particularized and, at least when the estimated data of progress do not meet the corresponding target values, notifying the members to the effect that the estimated data of progress do not meet the corresponding target values.

Further, for achieving the first object, the present invention provides a product development support system for supporting the product development activities of a plurality of members of a development project team, comprising:

a model storage means for storing resource models to be used for product development and product development activity models;

a target storage means for storing the general target values and the individual target values for the cost and the performance of a product and a development schedule;

an estimating means for estimating the cost, the performance, and the progress of the development schedule;

a reference support means for supporting the members of the development project team participating in product development activities to make reference to the models, the target values and the estimated data of progress;

a support means for supporting the members of the development project team participating in product development activities for operations to change and particularize the models;

a support means for supporting the members of the development project team participating in product development activities for operations to change and particularize the target values; and a notifying means for assessing the coordination of the general target value and the individual target values when the target values are changed or particularized and, at least when the general target value and the individual target values are out of coordination, notifying it to the members.

For achieving the second object, the present invention provides a development progress monitoring means for monitoring the progress of a plurality of processes for the development of a new product using a development support system that supports a plurality of members for exchanging electronic information and for sequentially completing the processes necessary for developing the new product, comprising:

a progress management parameter storage unit for storing at least one of a plurality of parameters corresponding to the plurality of processes to exchange the electronic information, as a progress management parameters being an index of progress of product development;

a progress management information monitoring unit for extracting information about the progress management parameters included in the electronic information;

a progress management information storage unit for storing the extracted information as the progress management information; and a progress management information reference unit for making reference to the progress management information stored in the progress management information storage unit.

The development support system in accordance with the present invention examines the estimated values of progress when the models are changed or particularized to see whether or not the estimated values of progress meet the corresponding target values and, at least when the estimated values of progress do not meet the target values, notifies it to the persons participating in the development activities.

When the target values are changed or particularized, the general target value and the individual target values are examined to see whether or not the general target value and the individual target values match with each other and, at least when the general target value and the individual target values do not match with each other, a notice is given to the members of the development project team participating in the development activities to that effect.

Accordingly, each member of the development project team is able to particularize a rough development plan made at the initial stage of development activities during the progress of development activities, to confirm the coordination of the estimated values of progress of general and individual activities objectively determined on the basis of design data and target values and the coordination of the target values of general activities and those of individual activities, and to work out an optimum plan to achieve the object.

The development progress monitoring means in accordance with the present invention automatically monitors information about the progress management parameters, i.e., information expressing the progress of development, included in the information exchanged between the members of the development project team participating in the development activities, and stores the monitored information in the progress management information storage unit. The members of the development project team are able to have a grasp of the condition of progress of the development activities by making reference to the progress management information stored in the progress management information storage unit.

Since the information about the progress management parameters are not obtained by exchanging electronic mails for development management, development management does not require any special work. Since the information is extracted from electronic mails relating to procedures essential to the development activities, the information is not different from the actual state of development activities, and the condition of the progress of development activities can be objectively monitored without requiring any additional work.

BRIEF DESCRIPTION OF THE DRAWINGS

FIG. 13 is a view showing a table displayed on a screen for a design department, an experimental model manufacturing department and a testing department to enter schedules;

FIGS. 16(1) and 16(2) are a table and a graphic representation, respectively, of progress management information displayed on screens, showing the condition of progress;

FIG. 19 is a view of assistance in explaining the format of messages on standard electronic mails;

FIG. 24 is a picture displayed on a screen, for setting expected completion dates for processes corresponding to progress management tasks;

FIG. 27 is an electronic mail for communication received during tests, displayed on a screen;

FIG. 29 is a picture of a data structure showing the relation between a problem communication electronic mail and measuring objects.

DETAILED DESCRIPTION OF THE PREFERRED EMBODIMENTS

A development support system in a preferred embodiment according to the present invention will be described hereinafter with reference to the accompanying drawings. The development support system is supposed to be used by development managers, machine designers, electrical designers, experimental model manufacturing engineers and experimental model testing engineers.

Figure 1:
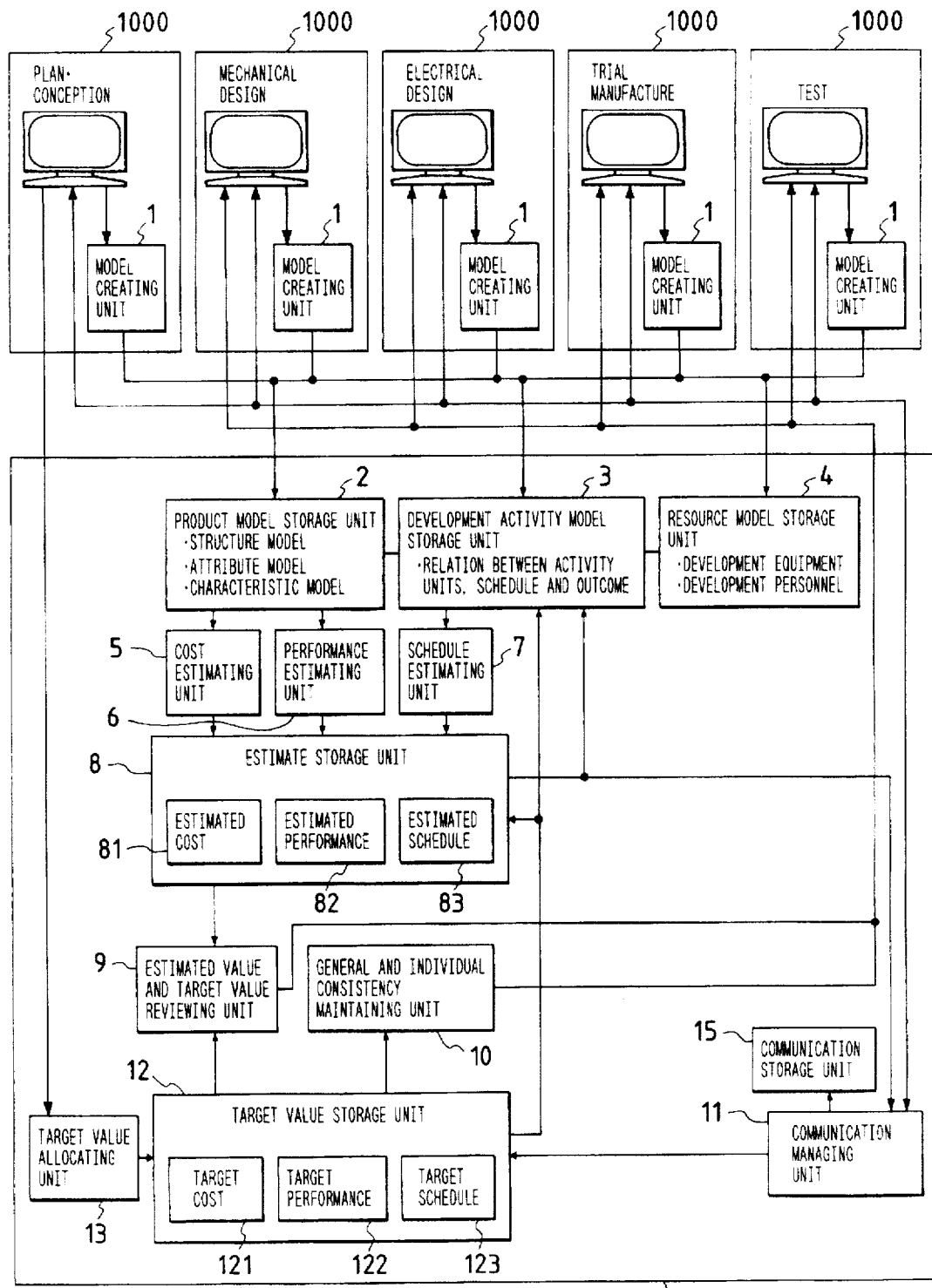
FIG. 1 is a block diagram of a development support system in a preferred embodiment according to the present invention.
Figure 2:
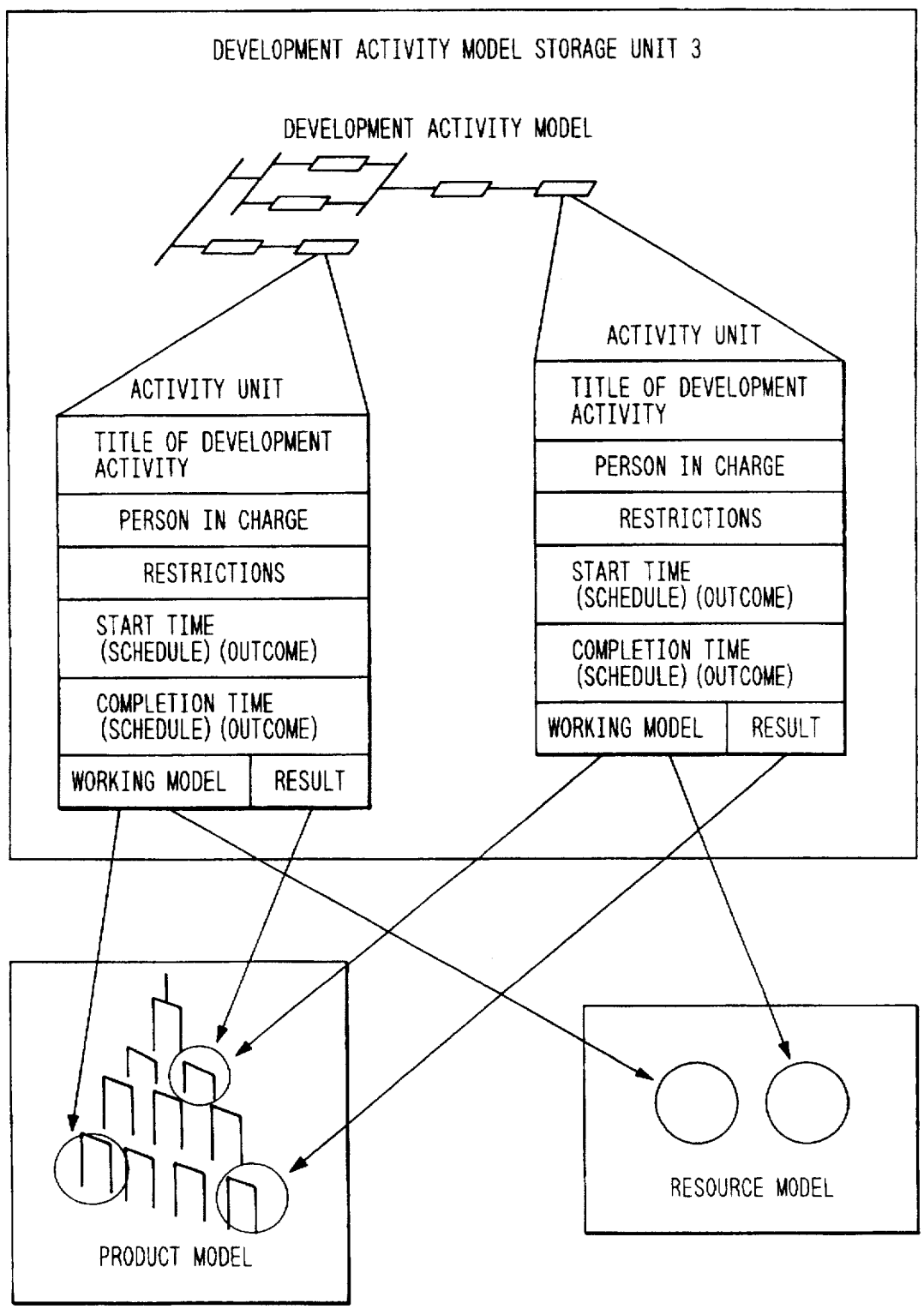
FIG. 2 is a view of assistance in explaining the configuration of development activity models employed in the development support system of FIG. 1.

Referring to FIG. 1, client machines 1000 are used by the members of a development project team and a server machine 2000 processes data according to instructions given thereto by the client machines 1000. Each client machine 1000 is provided with a model creating unit 1, which is used by the operator for creating product models, development activity models and resource models. Models created by operating the model creating unit 1 are stored in a product model storage unit 2, a development activity model storage unit 3 and a resource model storage unit 4, respectively, included in the server machine 2000. The product models describe the construction, the attribute and the characteristics of a product. The development activity models describe unit tasks, i.e., divisions of a general development task, the order of execution of the unit tasks, a schedule for carrying out the unit tasks and achievement of the unit tasks. The resource models describe the abilities of facilities necessary for development, such as experimental model manufacturing facilities and testing facilities, and information about the members of the development engineering team. As shown in FIG. 2, the development activity models link the product models and the resource models connected with development activities.

The server machine 2000 has a cost estimating unit 5 for estimating costs on the basis of the product models linked by the development activity models, a performance estimating unit 6 for estimating the performance on the basis of the product models linked by the development activity models, a schedule estimating unit 7 for estimating development schedule on the basis of the amount of work and resources for each unit task of the development activity models, and an estimate storage unit 8 for storing estimates provided by the units 5, 6 and 7. The estimates are stored in an estimated cost storage unit 81, an estimated performance storage unit 82 and an estimated schedule storage unit 83, respectively.

Target costs, target performance and target schedule are stored in a target value storage unit 12. The target values stored in the target value storage unit 12 are changed or particularized as the development activities progress. Changes and improvements in the target values are determined by conference between the members or by the members. Conference, decisions, changes and improvements made by conference, and decisions are controlled by a communication managing unit 11. Although the target values do not necessarily coincide with the estimated costs, the estimated performance and the estimated schedule, development activities must be managed so that the estimated values coincide with the corresponding target values. To realize such management, an estimated value and target value reviewing unit 9 checks the differences between the estimated values and the corresponding target values, and gives the results of checking to the client machines 1000 to notify the members of the difference or to enable the members to make reference to information. The target values include a general target value and individual target values on various levels, which must be consistent with the general target value. A general/individual target value consistency maintaining unit 10 checks the consistency and, if the individual target values are inconsistent with the general target value, notifies the members to that effect through the client machines 1000 to inhibit the change of the target values that may spoil the consistency.

Referring to FIG. 2 showing the structure of the development activity model stored in the development activity model storage unit 3, the development activity model is represented by a graph showing activity units and the precedence relation between the activity units. Described in each activity unit are the title of development activity, name of person in charge, restrictions, a resource model to be used for the development activity, a product model to which reference is to be made during development activity, a product model representing the results of development activity, scheduled start time, actual start time, scheduled completion time, and actual completion time. The schedule and the outcome of the development activity are thus shown for each activity unit. The plans are particularized and, when necessary, changes are made in the plans during the progress of development, because the product development activities are based on many indefinite factors. The development support system estimates the influence of changes in the contents of the development activity models on the schedule, the costs and the performance by the following procedure and informs the members of the development project team of the connection of the changes with the target values. Each member is therefore able to recognize and evaluate the influence of changes in the development activity models easily, able to make a program for the process of development to the completion of the development project on the basis of a prospect at the current time and able to describe the program in the development activity models.

The operation of the development support system in this embodiment will be described hereinafter in terms of the cooperative activities of the members of the development project team for managing the costs, the performance and the schedule so that their target values and the corresponding estimated values coincide with each other.

First an operation for implementing the development project while the development schedule is managed will be described. A schedule allocating unit 320 included in a target value allocating unit 13 sets a target schedule made at the start of the development project in the target value storage unit. The set target schedule is determined by a person in charge of formulating a plan of the new product with reference to the time when the new product is to be put on the market. The schedule allocating unit 320 makes a program with reference to data acquired by development activities in the past development projects and allocates scheduled terms required to achieve the development project by the time when the new product is to be put on the market to the development activity units.

Figure 6:
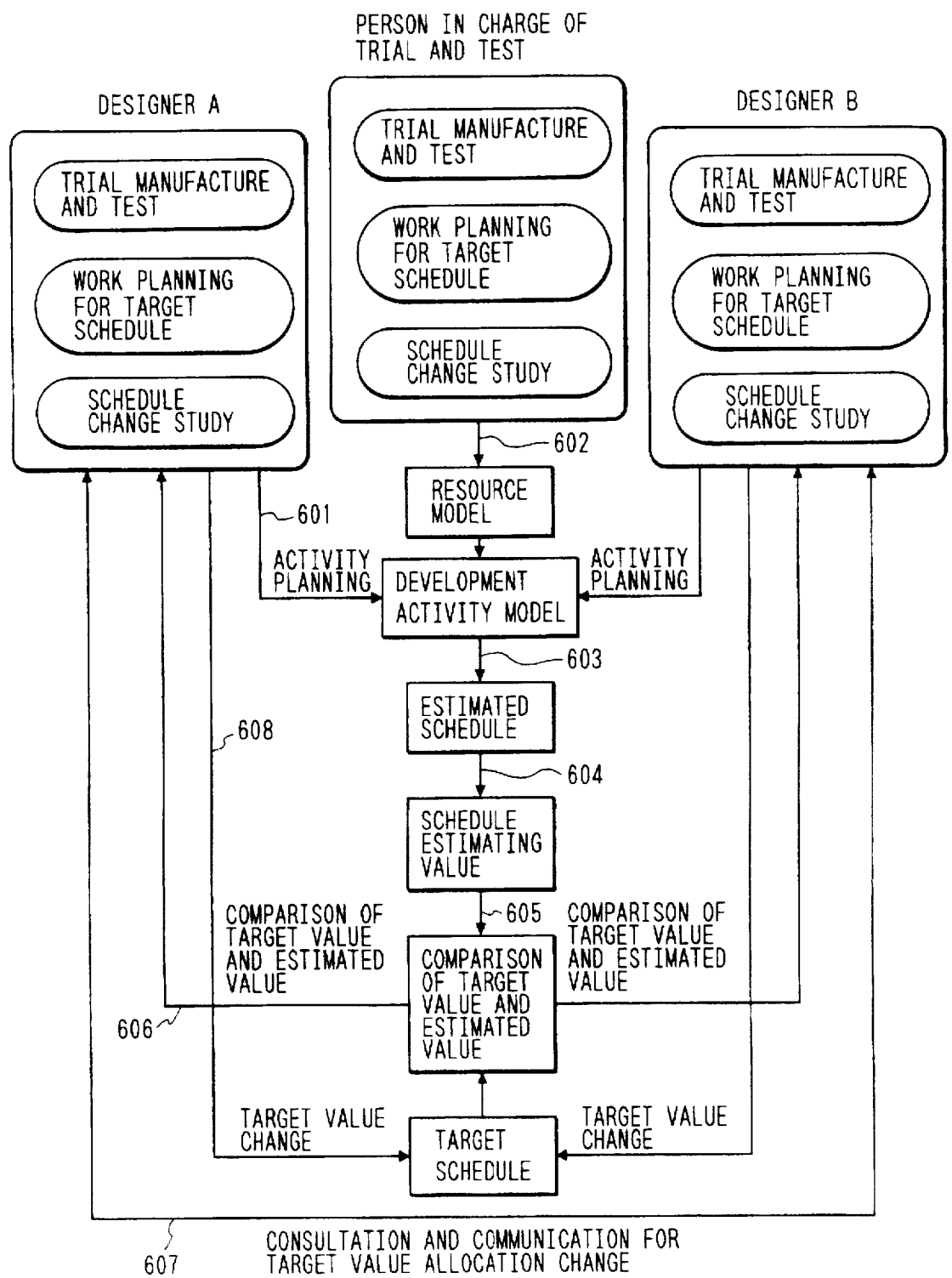
FIG. 6 is a block diagram of assistance in explaining the procedure for target schedule achievement management, employing the development support system of FIG. 1.

Then, as shown in FIG. 6, electrical designers and the like, for example, design electrical parts assigned to the electrical designers, store the design data of the electrical parts in the product model storage unit 2, estimate the amount of work necessary for completing development activities which are in the course of design and not started yet, and set activity programs in the development activity models as indicated at 601. Members in charge of experimental model manufacturing and testing, as well as designers, store the results of work to carry out tasks assigned thereto and included in the development activity models in the product model storage unit 2, estimate the amount of work necessary for completing tasks which are in the course of execution and not started yet, set activity programs in the development activity models, and store resource data including facilities and personnel available for development activities in the resource model storage unit 4 as indicated at 602.

The schedule estimating unit 7 estimates the condition of progress of the development project at the current time and the amount of work necessary for carrying out the rest of the development tasks on the basis of the development activity models as indicated at 603, makes an estimated development schedule by using the resource data including available facilities and available personnel stored in the resource model storage unit 4, and stores the estimated development schedule in the estimate storage unit 8 as indicated at 604.

Figures 8, 9:
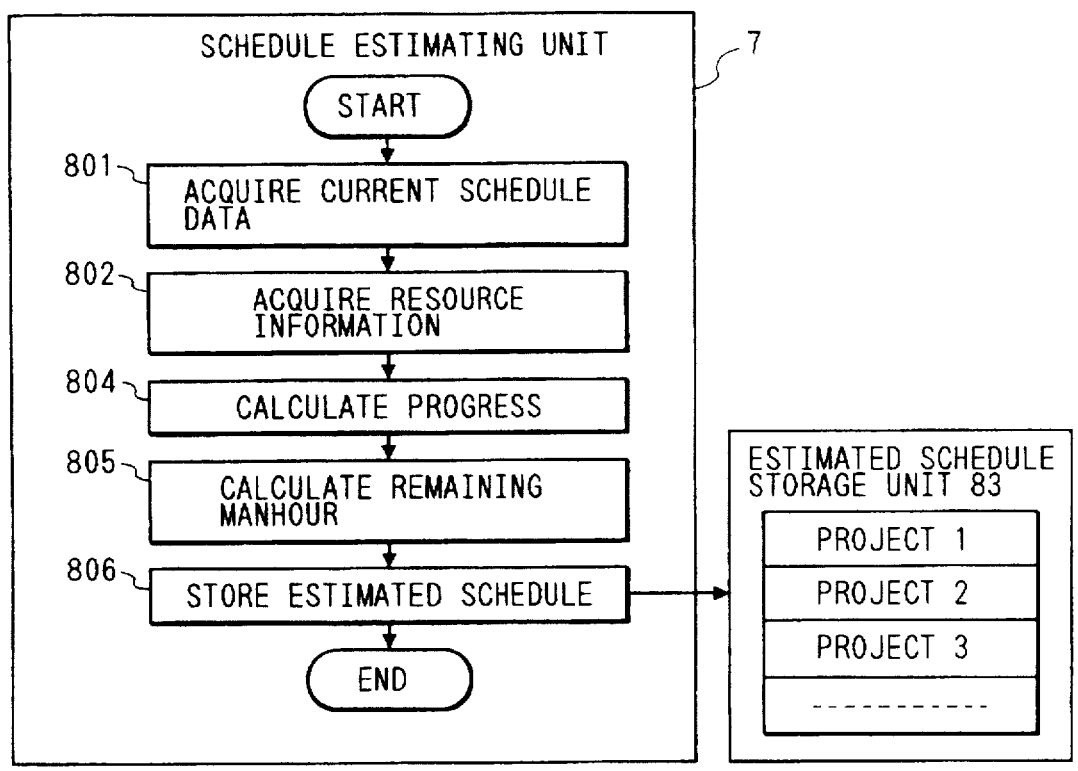
FIG. 8 is a flow chart of assistance in explaining a method of estimating completion date in accordance with the present invention.
FIG. 9 shows expressions for quantitatively determining the degree of progress of a development project.

A calculation procedure to be carried out by the schedule estimating unit 7 will be described hereinafter with reference to a flow chart shown in FIG. 8. In step 801 current schedule data representing the present state of the development project is fetched from the development activity model storage unit 3. Then, in step 802, information about the resources is fetched from the resource model storage unit 4. Then, the degree of progress of the development project is calculated in step 804, and the remaining manhours are estimated in step 805 by using definitions of the degree of progress of the development project shown in FIG. 9. Two indices shown in FIG. 9 indicate estimated remaining manhours obtained through the statistical analysis of completed tasks. The index 1 is used for estimating the remaining manhours on the basis of the number of tasks which have been finished before the time of estimation and manhours spent for finishing those finished tasks. The index 2 is used for estimating remaining manhours on the basis of problems which have been finished before the time of estimation and manhours spent for solving the problems. The problems are those obstructing the progress of the development project, such as troubles occurred in experimental models during tests. Expression showing the index 1 has a singular point at the start of the development project, wherein the denominator is zero, and expression showing the index 1 has a singular point when the number of solved problems is zero. These singular points are avoided to estimate the general schedule of the development project.

Referring again to FIG. 6, an estimated value and target value reviewing unit 9 compares the estimated schedule and the corresponding target schedule as indicated at 605 and provides the result of comparison to enable the members of the development project team to make reference to information about the schedules.

When the discrepancy between the estimated schedule and the target schedule become clear as the development project advances, the estimated value and target value reviewing unit 9 gives information to that effect to the members of the development project team and requests the members to take measures as indicated at 606.

Figure 10:
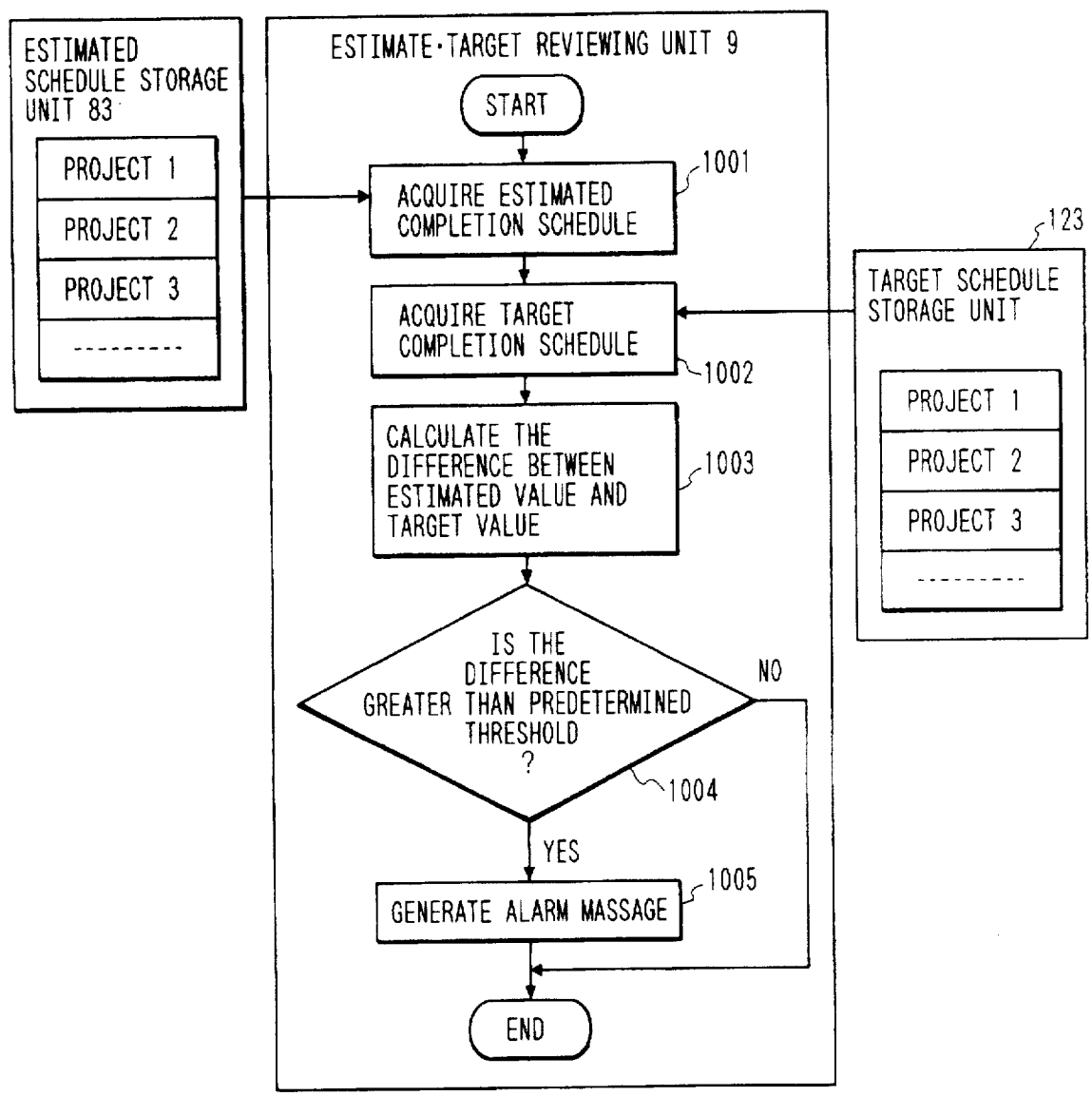
FIG. 10 is a flow chart of assistance in explaining a method of producing an alarm message in accordance with the present invention.

FIG. 10 is a flow chart of a reviewing procedure to be carried out by the estimated value and target value reviewing unit 9. The estimated value and target value reviewing unit 9 reads an estimated completion schedule from an estimated schedule storage unit 83 in step 1001, and then reads target completion schedule from a target schedule storage unit 123 in step 1002. The estimated value and target value reviewing unit 9 calculates the difference between the estimated completion schedule and the target completion schedule in step 1003 and, if the delay in the schedule is greater than a predetermined threshold (step 1004), generates an alarm message including destinations of the alarm message in step 1005. The information provided by the estimated value and target value reviewing unit 9 is thus displayed immediately for visual recognition of a problem schedule, so that the members connected with the problem schedule is able to take measures at an early stage. The measures include, for example, changing the order of development activities impeding the progress of the development project and increasing development resources. In any case, such measures affect other development activities, the members must hold a conference as indicated at 607. The communication management unit 11 changes the target values stored in the target value storage unit 12 and/or changes the resource models and the development activity models according to the conclusions of the conference as indicated at 608. The schedule estimating unit 7 estimates a development schedule again on the basis of the changed development activity models and stores an estimated schedule in the estimated value storage unit 8.

On the other hand, the contents of information determined by the conference and reflected on the target value storage unit 12 are evaluated by the general/individual target value consistency maintaining unit 10. If the estimated values and the corresponding target values are inconsistent with each other or the individual target values and the general target value are inconsistent with each other, the general/individual target value consistency maintaining unit 10 gives information to that effect to the members of the development project team, so that the inconsistent state can be corrected without fail.

Figure 11:
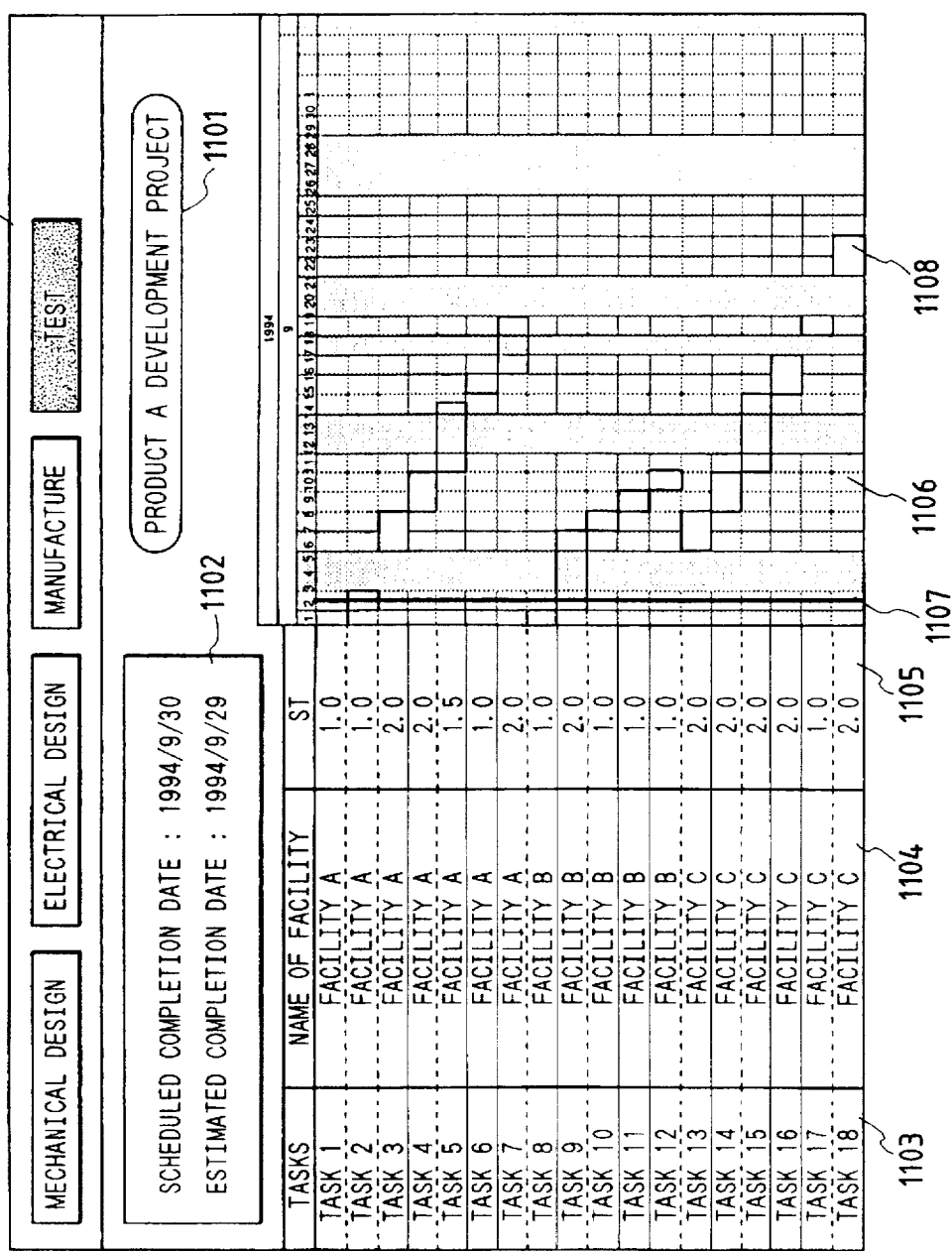
FIG. 11 is a view of a screen displaying a table for planning and editing a schedule.

The foregoing embodiment will be described in further detail in terms of a concrete example shown in the drawings. FIG. 11 shows a table displayed on a screen and specifying schedules of tasks (activity units) included in the development activity models. The operation of the development support system will be described on an assumption that the development project is in a phase in which parts have been designed and an experimental model is subjected to performance tests for testing the performance of the experimental model to see if target performance is achieved. In this case, tasks (activity units) are the performance proof test items. In this example, the schedule of the performance tests is controlled by the testing department and therefore a button indicating the testing department among buttons indicating users shown in a window 1100 is selected to open a schedule planning table on the screen.

The schedule planning table has a project name indicating section 1101, a scheduled completion date indicating section 1102, a task indicating section 1103 in which to indicate all the tasks to be carried out in the development project, a resource indicating section 1104 in which resources necessary for carrying out the tasks are indicated, a standard necessary time indicating section 1105 in which standard necessary times necessary for carrying out the tasks are indicated, and a schedule indicating section 1106 in which schedules for carrying out the tasks are indicated by bars of lengths corresponding to the standard necessary times. For example, suppose that the present day is September 2. Then, a present day indicating line 1107 is displayed at a position corresponding to the date of September 2. As mentioned above, the respective lengths of the schedule bars 1108 correspond respectively to the standard necessary times. The name of the development project is entered by operating the keyboard of the model creating unit 1 of the client machine 1000. The entered name of the development project is stored in the development activity model storage unit 3. The scheduled project completion date displayed in the scheduled completion date indicating section 1102 corresponds to the completion date stored in the development activity model storage unit 3 and the scheduled project completion date can be changed by operating a target value setting button 1112. When the target value setting button 1112 is operated by communication management unit 11 carries out a target value setting procedure. The estimated completion date on which the development project is expected to be completed indicated in the scheduled completion date indicating section 1102 is stored in the estimate storage unit 8. The estimated completion date is determined through calculation performed by the schedule estimating unit 7 as explained previously with reference to FIG. 8. The scheduled completion date and the estimated completion date are compared, and the development support system blinks a button representing the testing department, i.e., a schedule management department, among buttons representing the users displayed in the window 1100.

A progress data input button 1109 will be described hereinafter. Each time one task is completed, the testing process needs to confirm the completion of the task, because the design of the product is regarded as complete only when all the test items are cleared. The progress data input button 1109 is operated to enter an indication "Acceptable", "Unacceptable" or "Suspended".

Figure 12A:
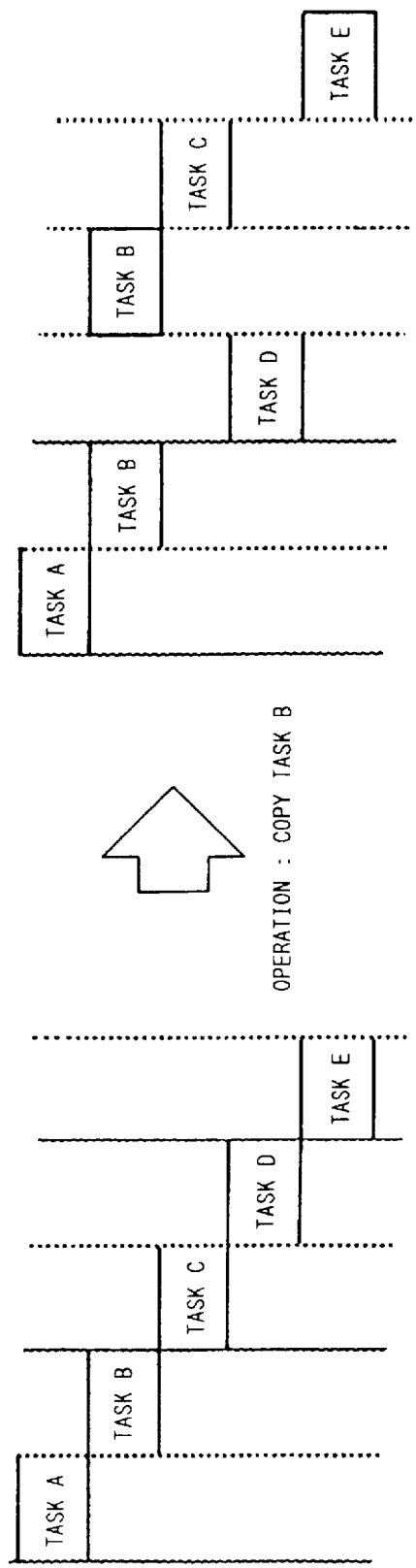
FIGS. 12(a) and 12(b) are diagrammatic views of assistance in explaining the precedence relation between tasks.
Figure 12B:
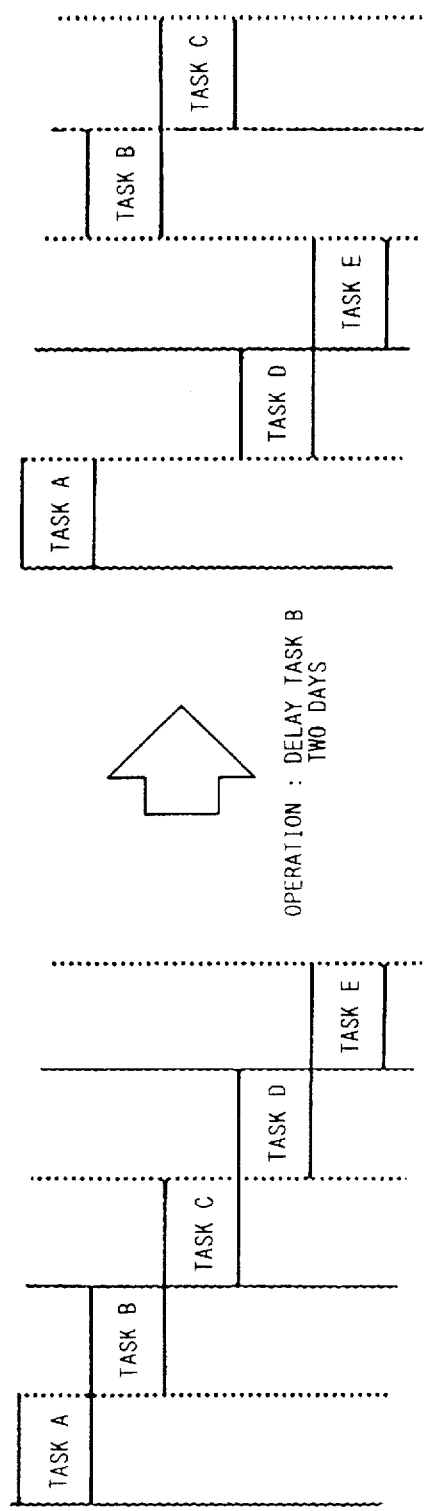

The function of a copy/move button 1110 will be described hereinafter. The precedence relation between the tasks is determined beforehand. The precedence relation is specified by operating the model creating units 1 of the client machines 1000 at the early stage of planning. The precedence relation defines restrictive conditions, such as "A task B should not be executed unless a task A becomes acceptable." Copying and moving of the tasks defined by the precedence relation will be described with reference to FIG. 12. Suppose that the order of execution of tasks B and C are defined by the precedence relation and the task C cannot be executed unless the task B becomes acceptable. First, "Copying" will be described. FIG. 12(a) shows a state where the task B has not become acceptable and is to be executed again two days later. In this development support system, the task B can be copied by operating a copy button to copy relevant test items. When the copy button is operated, all the task attributes except the date of execution are copied. When it is specified to execute the task B two days later after copying the task B, the task C is moved automatically to a position next to that of the task B as shown in the right section of FIG. 12(a). Unoccupied days are occupied automatically by tasks following the task C and the schedules of tasks following the task C are shifted automatically backward. "Moving" will be described hereinafter. FIG. 12(b) shows a state where the task B could not be executed on scheduled days for some causes and the execution of the task B is delayed forcibly two days. When the execution of the task B is delayed two days, the task C in the precedence relation with the task B is moved automatically, and tasks D and E which have been behind the tasks B and C are advanced automatically to unoccupied days from which the tasks B and C have been moved, the consequence of which is shown in the right section of FIG. 12(b). The plan for the execution of the tasks can be quickly worked out infallibly because the order of execution of the tasks is defined by the precedence relation.

The operations of the communication management unit 11 based on the conference between the members of the development project team for adjusting the target values stored in the target value storage unit 12 and giving inconsistency alarms will be described by way of example with reference to FIG. 13. When a problem that will impede the progress of the development project arises in the course of the development project, countermeasures must be taken immediately so that the schedule of the development project may not be delayed. However, the schedule is framed and amended by the testing department, while the countermeasures are worked out by the design department, and the countermeasures are executed and the experimental model is modified by the testing department. Accordingly, the testing department must know the schedules of the design department and the experimental model testing department to determine a date for retesting in case a problem arises in the experimental model. The communication management unit 11 is used for acquiring information about the schedules of other departments and for setting a term on the basis of the schedules of other departments. FIG. 13 shows a table of assistance in explaining a schedule input operation for making an agreement on a task 4. When the task 4 shown on a schedule table shown in FIG. 11, a window is opened in the schedule table, and a problem section 1301 in which a problem is mentioned and an action section 1302 in which a countermeasure for the problem is mentioned are displayed. The members enter promissory schedules in sections for the departments to which they belong. For example, the member of the design department enters the promissory schedules in a sections 1303 for design change schedule, a section 1304 for design change completion and a section 1305 for desired modification schedule. The member of the experimental model manufacturing department enters promissory schedules in a section 1306 for modification schedule, a section 1307 for modification completion and a section 1308 for desired test schedule. The testing department that works out a test schedule is able to determine a new test schedule with reference to the promissory schedules indicated in the window. This development support system enables making reference to the data entered in the table by the member in charge even if the relevant member is away when an inquiry is made by phone. The development support system monitors the schedules entered in the section 1303 for design change schedule and the section 1304 for design change completion schedule by the design department continuously. If any date is not entered in the section 1304 for design change completion date after the date entered in the section 1303 for design change schedule, the development support system gives an alarm and blinks a red light indicating the design department. An alarm is given also when the dates entered in the section 1306 for modification schedule and the section 1307 for modification completion relating with the experimental model manufacturing department are delayed. The development support system manages time limits automatically and gives alarms in this way when the scheduled dates are delayed to limit the delay of the schedules to the least possible extent.

The schedules are thus controlled by the development support system of the present invention in the course of the development project. Functions of the development support system of the present invention for controlling costs in the course of the development project will be described hereinafter.

Figure 3:
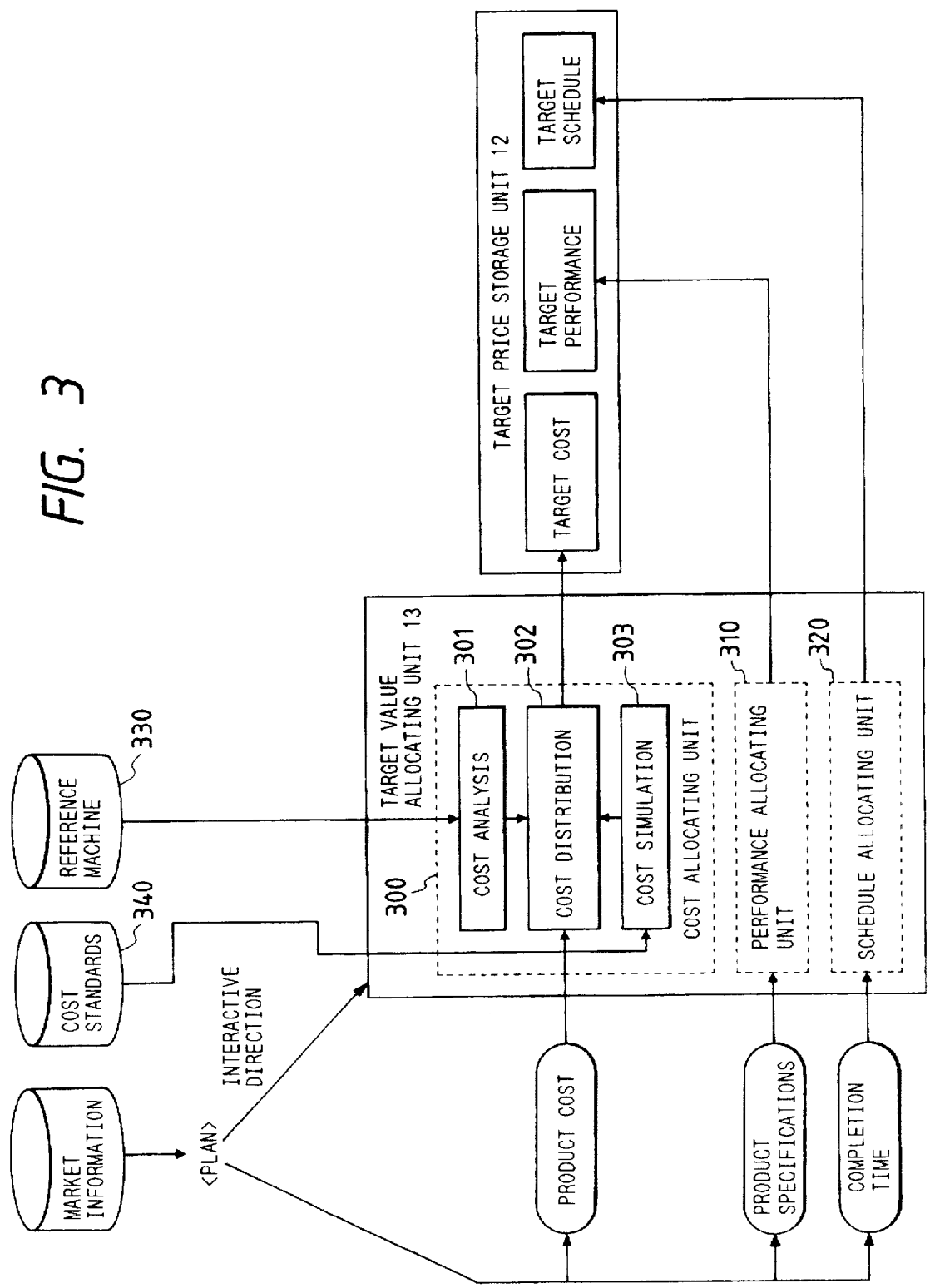
FIG. 3 is a block diagram of assistance in explaining a procedure for development target setting, employing the development support system of FIG. 1.

A member of the development project team in charge of formulating a plan of a new product determines the target cost of the new product on the basis of market information and such. As shown in FIG. 3, a target value allocating unit 13 has a cost allocating unit 300 for allocating target costs to the component units of the product, a performance allocating unit 310 for allocating requirements of performance, and a schedule allocating unit 320 for allocating schedules. The cost allocating unit 300 allocates costs to the component units of the product and stores target costs of the component units in the target value storage unit 12. The cost allocating unit 300 has a cost analyzing module 301 which receives existing reference machine information 330 and analyzes the reference machine information 330 to determine the costs of the component units and processes, a cost simulating module 303 which receives cost standards 340 including the number of products produced, material costs and personnel expenses, and simulates the cost of the product on the basis of the standard cost standards 340, and a cost distributing module 302 which utilizes the functions of the cost analyzing module 301 and the cost simulating module 303 to distribute the costs to the component units.

It is desirable that the target value allocating unit 13 operates in an interactive mode according to instructions given thereto by the member in charge of formulating a plan instead of fully automatically operating. In the initial stage of the development project, the cost is allocated to the subassemblies of the component parts and to the principal component units.

Figure 4:
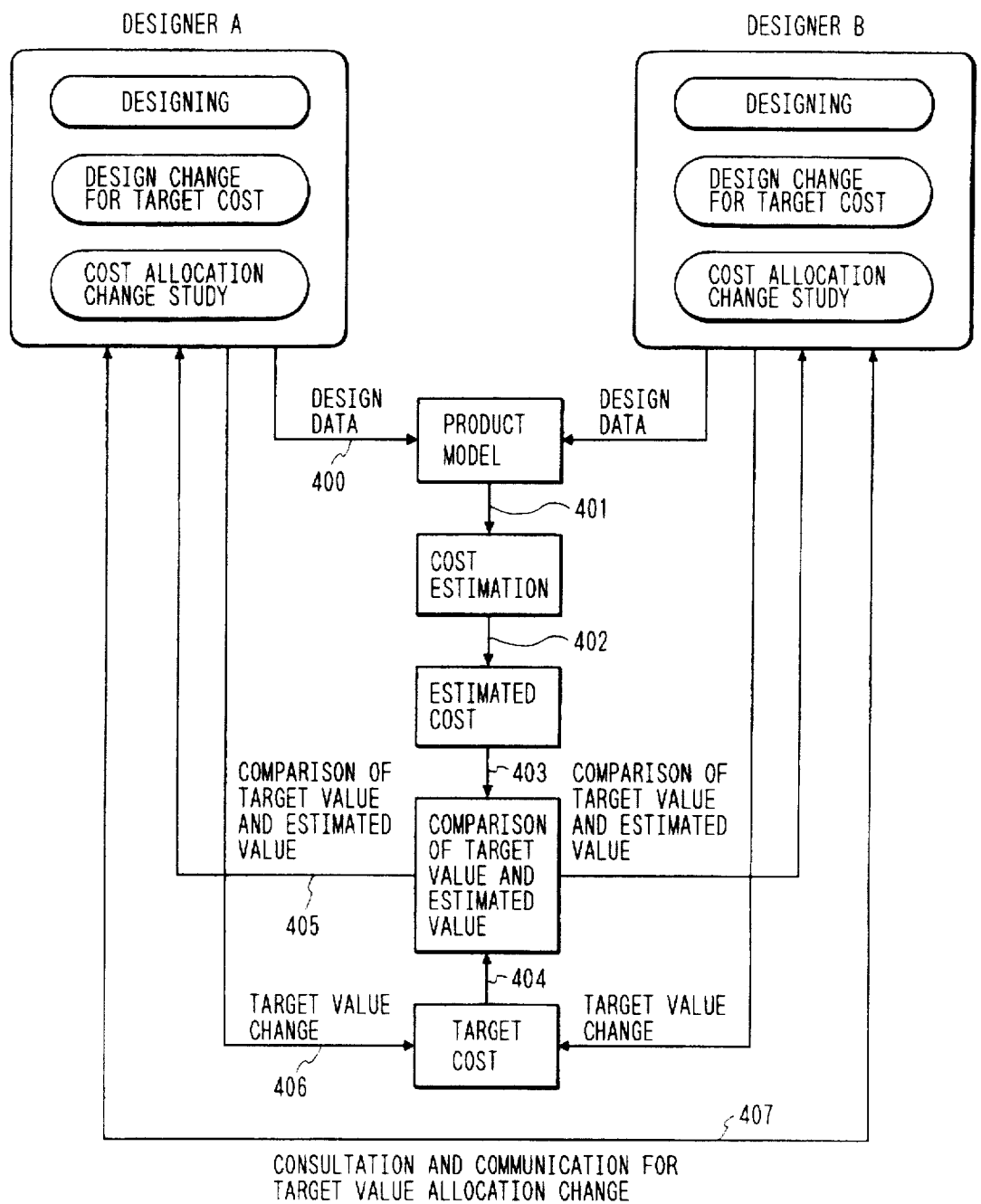
FIG. 4 is a block diagram of assistance in explaining a procedure for cost management, employing the development support system of FIG. 1.

The members particularize the design by a procedure illustrated in FIG. 4. For example, the machine designer and the electrical designer are assigned to parts included in the development activity models, design those parts, and stores the designs as structural models and attribute models in the product model storage unit 2 as indicated at 400. The cost estimating unit 5 estimates the costs as indicated at 401 on the basis of the models and stores estimated costs in the estimate storage unit 8 as indicated at 402. The estimated value and target value reviewing unit 9 compares the estimated costs with the corresponding target costs, and enables the members of the development project team to make reference to the results of comparison when necessary. At this stage, if the units for which the costs have been estimated do not correspond to the units for which target costs are determined, and the units for which the costs have been estimated are part of the units for which target costs are determined, the estimated value and target value reviewing unit 9 divides the target costs into those of the units for which the costs have been estimated and those of the units for which the costs have not been estimated, and stores values obtained by subtracting the estimated costs of the units from the target costs of the same units as the target costs of the rest of the units.

As the designing work progresses and the estimated cost of each unit for which the target cost is determined is determined, and the estimated cost is greater than the target cost, the estimated value and target value reviewing unit 9 inform the members to that effect and requests the members to take measures for reducing the estimated cost as indicated at 405. A method of changing the design of parts of estimated costs exceeding the corresponding target costs to reduce the estimated costs and a method of adjusting the target costs of such parts to the estimated costs are possible measures. However, if the latter method is employed, the sum of the target costs of the parts does not coincide with the target cost of the product. In such a case, the general/individual target value consistency maintaining unit 10 detects the discrepancy between the sum of the target costs of the parts and the target cost of the product, informs the members of the development project team to that effect and requests measures for adjusting the discrepancy. Possible measures are a method of making the sum of the target costs of the parts coincide with the target cost of the product by reducing the target costs of other parts and a method of making the sum of the target costs of the parts coincide with the target cost of the product by changing the target cost of the product. The selection of either method decided by a conference between the members as indicated at 407 or by a responsible person participating in the development project. The communication management unit 11 stores the conclusions of the conference in the target value storage unit 12 as indicated at 406.

Decisions made by the conference are stored in the target value storage unit 12 and the contents of the decisions are evaluated by the general/individual target value consistency maintaining unit 10. When the estimated costs and the corresponding target costs are different from each other or the sum of the target costs of the parts does not coincide with the target cost of the product, the members of the development project team are informed to that effect, so that the inconsistent state is never left as it is.

The management of the target performance in the course of the development project will be described hereinafter. In performance management, similarly to cost management, the performance allocating unit 301 of the target value allocating unit 13 sets target performance determined at the beginning of the development project in the target value storage unit 12. The set target values of performance of the new product are determined on the basis of market information and such by the member in charge of formulating a plan of the new product, the performance allocating unit 310 makes reference to the characteristics and the experimental data of existing reference models, and allocates related characteristics of the new product so that the plan will meet the target performance.

For example, suppose that the new product is an air conditioner and the performance is expressed by the cooling capacity and noise. Then, the characteristics relating to cooling capacity are the characteristics of a heat exchanger, a compressor, fan and the like, and the characteristics relating to noise are sound generated by air blown by the fan, vibrational sound generated by a casing and noise generated by motors. The performance allocating unit 310 makes reference to the characteristics of the existing reference models and the experimental data of the development model, and determines target values for the sound of air blown by the fan, the vibrational sound generated by the casing and the noise generated by the motors, taking general target noise into consideration.

Figure 5:
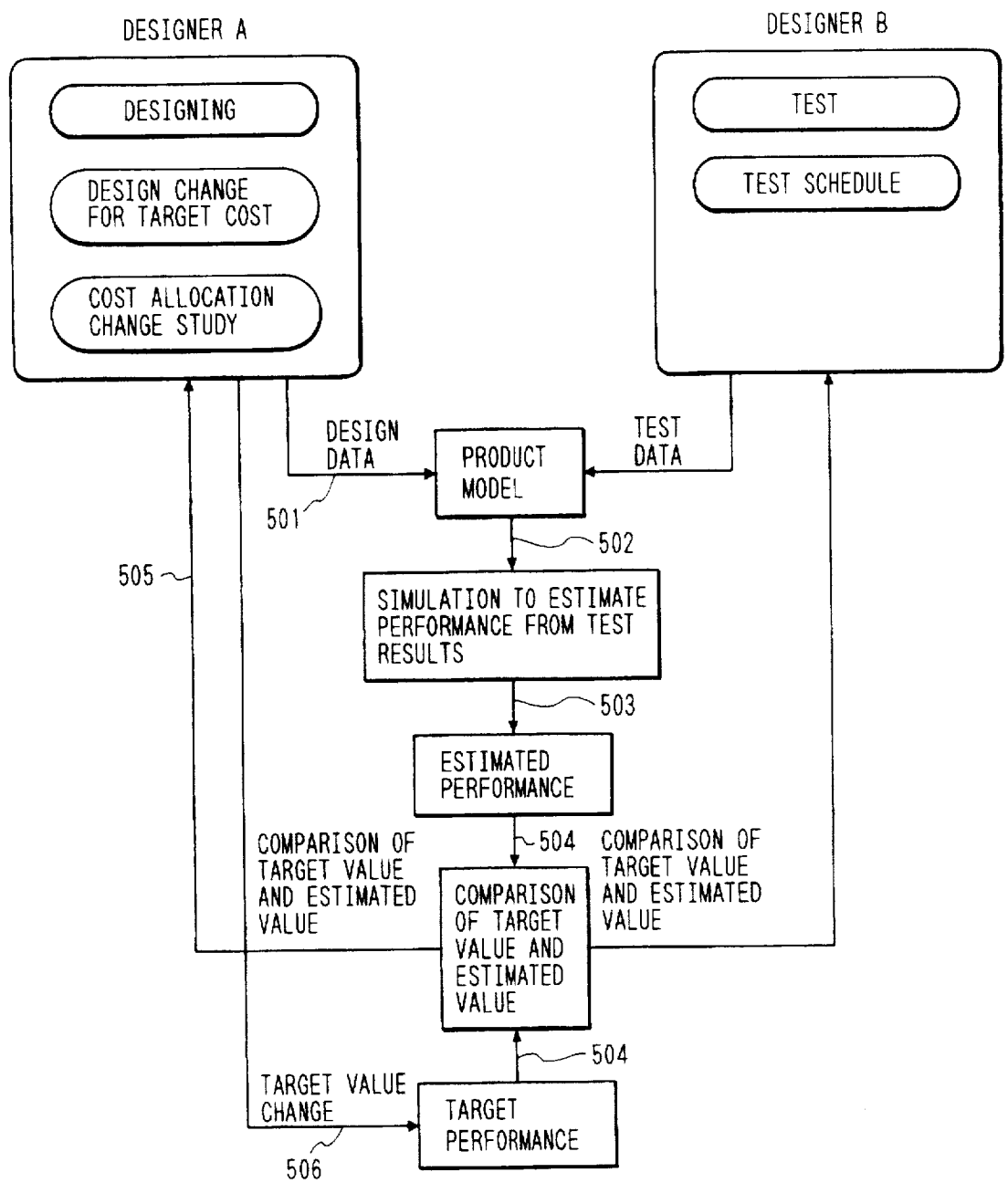
FIG. 5 is a block diagram of assistance in explaining a procedure for target schedule achievement management, employing the development support system of FIG. 1.

The members of the development project team particularize the designs of the components using the target performance values as shown in FIG. 5. For example, the machine designers and the electrical designers design components represented by the development activity models and assigned to them, and store designs as characteristic models in the product model storage unit 2 as indicated at 501. The performance estimating unit 5 estimates the performance on the basis of the models as indicated at 502 and estimated performance values in the estimate storage unit 8 as indicated at 503. The estimated performance values are determined by simulation, on the basis of the recorded data or on the basis of the experimental data of an experimental model. The accuracy of estimation through simulation and estimation based on the recorded data and the accuracy of estimation bas ed on the experimental data of the experimental model are greatly different from each other. Therefore, the method used for estimating the performance is stored together with the estimated performance values. The estimated value and target value reviewing unit 9 compares the estimated performance values with the corresponding target performance values as indicated at 504 and enables the members to make reference to information about the results of comparison.

When the estimated performance values, including performance values determined through experiments, thus estimated in the course of designing turned out to be inferior to the target performance values, the estimated value and target value reviewing unit 9 inform the members to that effect and request the members to take measures for particularizing the estimated performance values as indicated at 505. The measures include a method of changing the designs of the parts unable to achieve the target performance values and a method of reducing the target performance values for the parts unable to achieve the target performance values. The use of the latter method must be determined by a conference between the members of the development project team or by a responsible person participating in the development project. The communication management unit 11 stores the conclusions of the conference in the target value storage unit 12 as indicated at 506. The conclusions of the conference and decisions are thus stored in the target value storage unit 12, and the general/individual target value consistency maintaining unit 10 evaluates the conclusions of the conference and the decisions. If the estimated values do not coincide with the corresponding target values or if the sum of target values for individual parts is inconsistent with the general target value, the members of the development project team are informed to that effect, so that the inconsistent state is never left as it is.

Operation for changing and particularizing the development activity models in the course of the development project will be described hereinafter. As mentioned above, the rough development activity models formed in the early stage of the development project is particularized by degrees by the following procedure.

Figure 7:
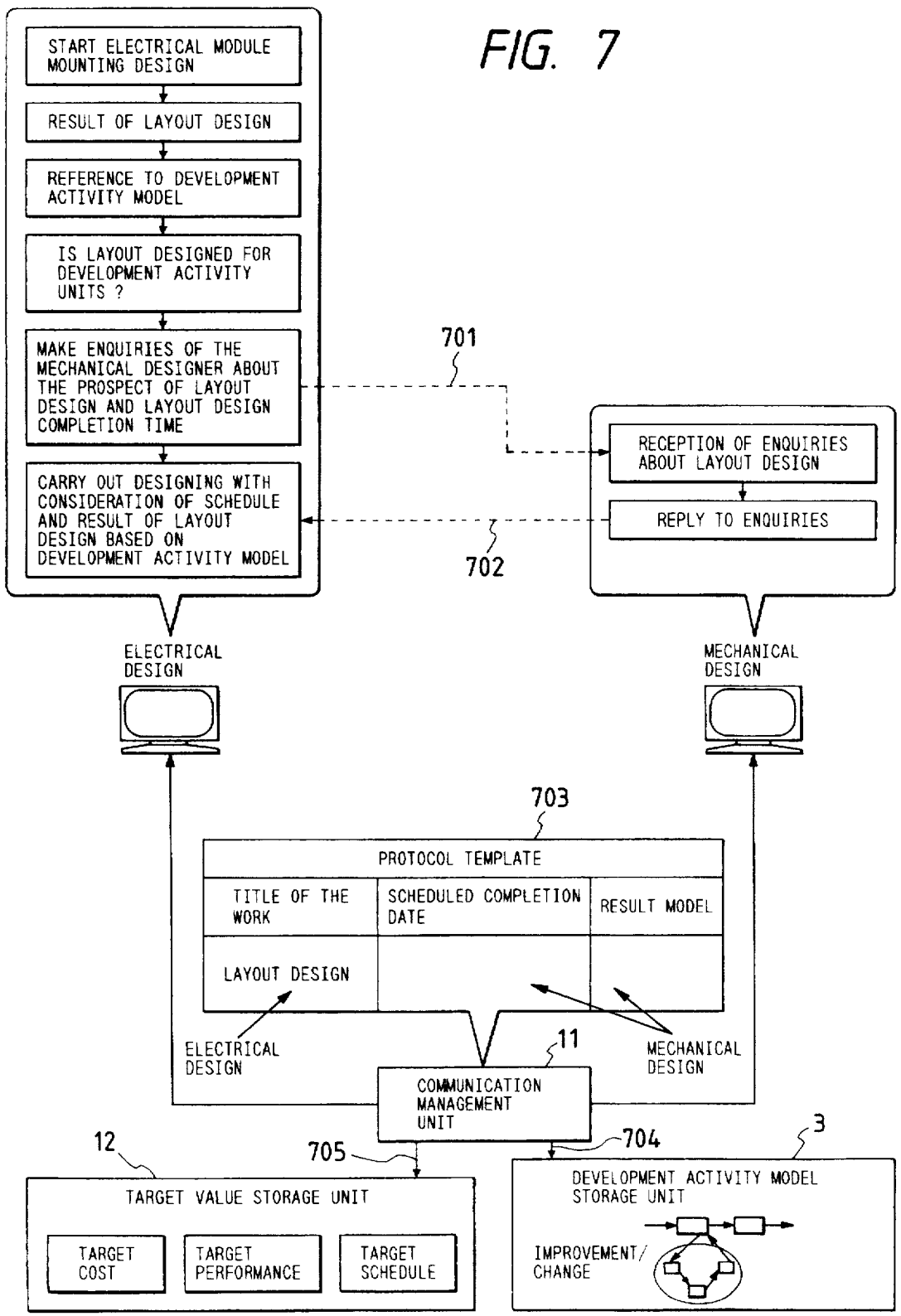
FIG. 7 is a block diagram of assistance in explaining a procedure for changing and particularizing a development activity model, employing the development support system of FIG. 1.

Each member of the development project team often needs to consult the results of activities of the other members in carrying out the task assigned to the member among those included in the development activity models; for example, an electrical designer needs the data of layout of mechanical parts to design an arrangement for mounting an electrical part, and results of characteristic tests of items of design specifications are necessary for determining minute design parameters. When these tasks are described as activity units in the development activity models, the member of the development project team is able to make reference to the results of the tasks and the schedules of the tasks. However, if the tasks are part of the activity unit described in the development activity models, the members other than a member in charge of the task are unable to know the results of the task and the schedule of the task. In such a case, the member inquires of the member in charge of the task of which the former member wants to know in detail the results and the plan of the task as indicated at 701 in FIG. 7. The inquiry can be made by sending an electronic mail of a predetermined format 703 to the member in charge of the task. A reply to the inquiry may be made by an electronic mail. The activity unit has an identification code identifying a responsible member responsible to the activity and each member is able to make reference to the development activity models, the members are able to recognize inquiries about activity units and electronic mails can be exchanged.

The communication management unit 11 manages the contents of inquiries 701 and replies 702 exchanged by means of electronic mails, and stores new target values in the target value storage unit 12 as indicated at 705 and new development activity units in the development activity model storage unit 3 as indicated at 704 according to the contents of the replies. New target setting includes, for example, detailed breaking down of the rough schedules of tasks, target costs and target performance. A development activity to achieve target values is described as one activity unit in the development activity models. Members' inquiries about the tasks of which the members want to know and replies to the inquiries particularize the development activity models and the target values. The change and the particularization of the activity units of the development activity models are made by the members assigned to the activity units. The member assigned to each activity unit may be changed. Each item of the product models and the resource models is provided with an identification code for identifying the member who determined the contents to manage the members assigned to the items for referencing and writing.

As is apparent from the foregoing description, the development support system in this embodiment stores the product models expressing the structure and the characteristics of a product comprising component parts designed respectively by the members assigned thereto in the product model storage unit, the performance and the cost of the product is estimated on the basis of the product models, estimated schedules are determined on the basis of the development resources and the amounts of development work necessary for developing the component parts, and an estimated general schedule of the product development project is determined by adding up the estimated schedules for developing the component parts. The members of the development project team are thus able to use in common the estimated general schedule of the development project that varies as the development project progresses. The estimated general schedule and the estimated individual schedules are compared with the corresponding target schedules, and the development activity program can be adjusted so that the target schedules can be achieved. The targets and the plans of the mutually related activities can be automatically corrected or improved on the basis of information contained in the inquiries and replies exchanged between the members of the development project team to update the target values continually and the members are able to access the updated target values. Accordingly, the members participating in the product development project particularize the rough development program worked out in the early stage of the product development project as the product development project progresses to maintain the consistency of the estimated general schedule and to work out an optimum program to achieve the target values.

A procedure to be carried out by the communication management unit 11 for automatically setting the achievement information to be stored in the development activity model storage unit 3 and the target values to be stored in the target value storage unit 12 by monitoring the information exchanged between the members will be described hereinafter.

Figure 14:
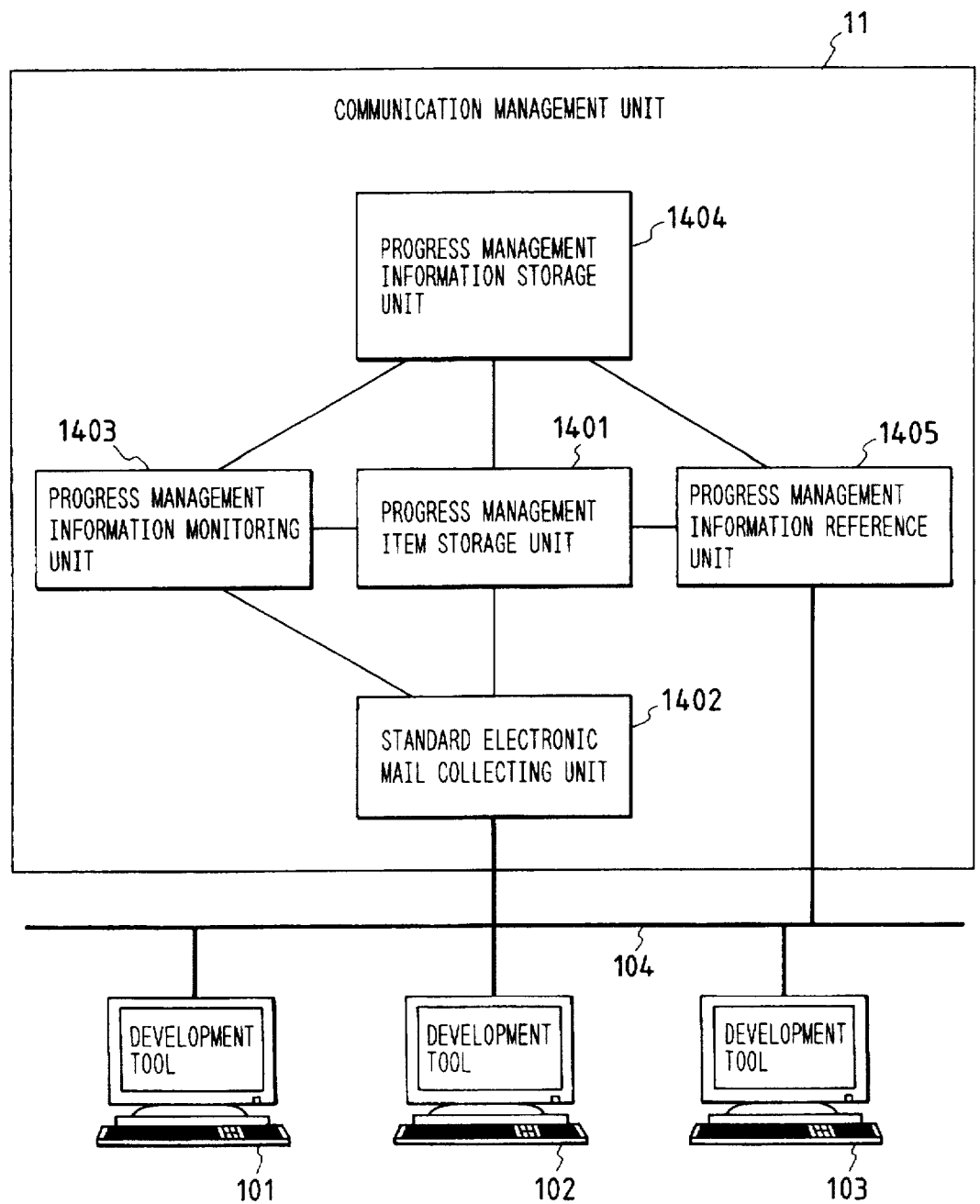
FIG. 14 is a block diagram of a development progress monitoring system included in the development support system of FIG. 1.

Referring to FIG. 14, the communication management unit 11 included in the development support system in this embodiment comprises a progress management item storage unit 1401 for storing progress management items, i.e., predetermined progress management indices, a standard electronic mail collecting unit 1402 for collecting standard electronic mails exchanged between departments participating in the development project, a progress management information monitoring unit 1403 for extracting information about the progress management items from the collected electronic mails, a progress management information storage unit 1404 for storing the information extracted from the collected electronic mails as progress management information, a progress management information reference unit 1405 for making reference to the progress management information stored in the progress management information storage unit 1404, and an input/output unit, not shown, for receiving external operations and displaying results of processing.

The progress management items, i.e., indices of progress, stored in the progress management item storage unit 1401 are classified into progress management items concerning the structure of the product to be developed or each of the component parts of the product, and progress management items concerning the functions of the same. The progress management items concerning the structure are, for example, the date of starting drawing a design drawing, the date of completion of the design drawing, the date of requesting the estimation of a part based on the design drawing, and the date of reception of the estimation. The progress management items concerning the functions are, for example, the date of starting the examination of required performance, the date of determination of the required performance, the date of ordering the trial manufacture of an experimental model, the date of delivery of the experimental model, the date of starting the tests of the functions, and the date of completion of the tests of the functions. The progress management items concerning functions do not directly indicate the progress of the development project but indicate the degree of achievement of desired functional characteristics.

The progress management items stored in the progress management item storage unit 1401. The progress management items stored in the progress management item storage unit 1401 can be deleted and additional progress management items can be stored in the progress management item storage unit 1401 by operating an external input device, such as a keyboard. The progress management information reference unit 1405 provides the information management information according to instruction given thereto by operating an external input device, such as a keyboard, and the progress management information can be displayed on an output device, not shown, such as a CRT.

Concretely, the communication management unit 11 of the development support system in this embodiment is, for example, a computer comprising an information processor provided with a CPU and memories, and an input/output unit provided with a CRT and a keyboard.

The communication management unit 11 of the development support system in this embodiment is connected through an information network 104, such as a LAN (local area network) to the development tools 101, 102, 103, . . . of the members of the departments participating in the development project.

The members of the development project team uses, for example, CAD tools (computer-assisted design tools) and terminal information processors to carry out the work concerning the development project and to perform administrative communications necessary for carrying out their own work, such as requesting estimation, replying to the request for estimation, placing orders, reporting delivery, giving instructions for trial manufacture and communicating the achievement of manufacture. The members participating in the development project are not limited only to those whose principal work is activities for the development of the product but may include the personnel of other management departments. This development system uses standard electronic mails for administrative communications for communicating information about the progress management items, among the administrative communications. The development tools 101, 102, 103, . . . need not necessarily be connected to the information network 104, standard electronic mail input/output terminal devices may be connected to the information network 104 instead of the development tools.

The communication management unit 11 is able to gasp the condition of progress of the development project by collecting standard electronic mails by the standard electronic mail collecting unit 1402 and monitoring the information about the progress management items contained in the standard electronic mails by the progress management information monitoring unit 1403. Concrete examples will be described hereinafter.

Figure 15:
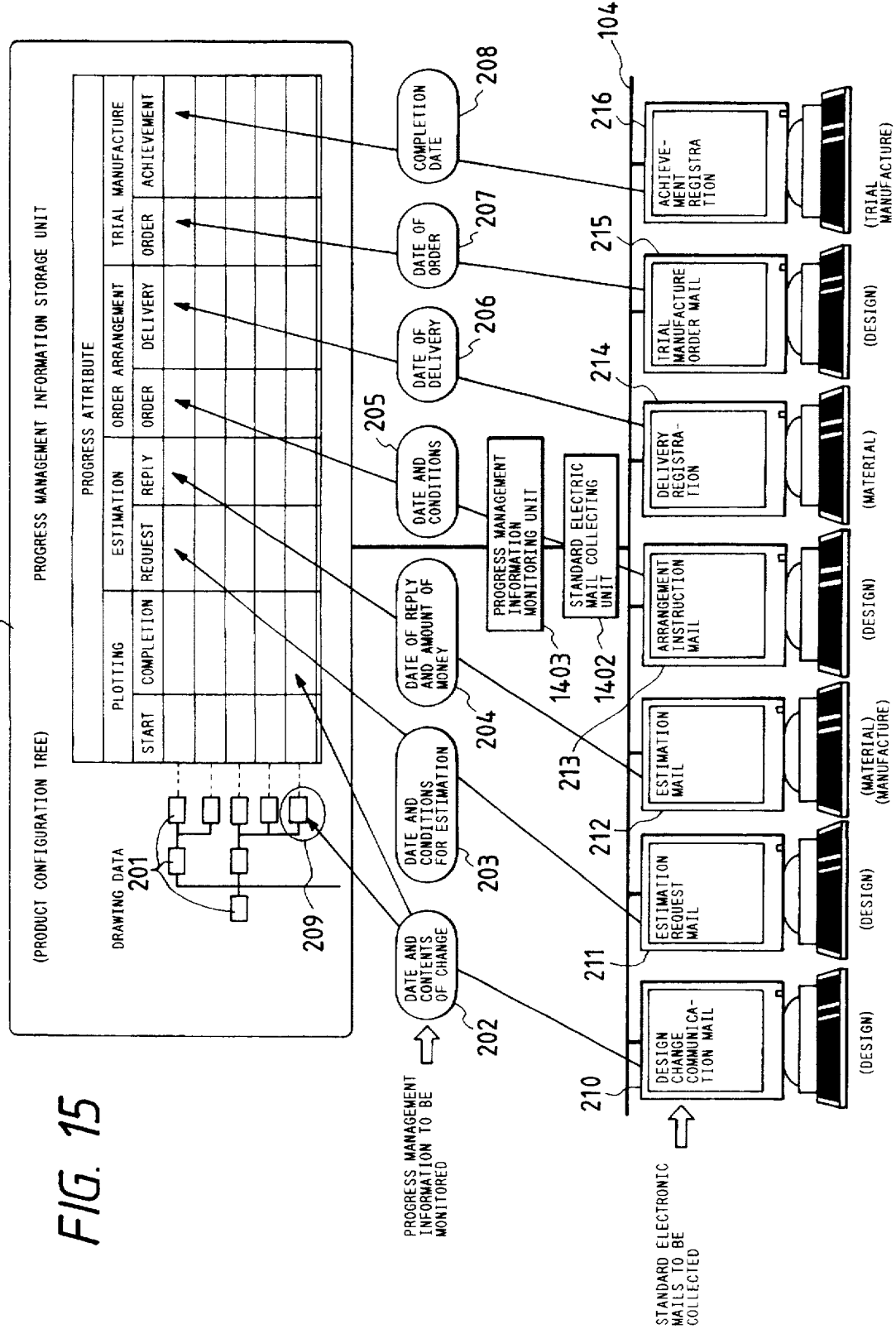
FIG. 15 is a block diagram of assistance in explaining a method of monitoring development progress using progress management information based on the construction of the product.

A concrete example of progress management information about the progress management items relating to the construction of the development product will be described with reference to FIG. 15 on an assumption that a product configuration tree showing the constitution of the product is used as a mode of storing the progress management information. The product configuration tree shows the component modules of the product and the hierarchical relation between the parts and, basically, the product configuration tree is identical with data generally called a product configuration tree in structure. As shown in FIG. 15, the product configuration tree stored in the progress management information storage unit 1404 is characterized by storing information indicating the progress of process, such as requesting estimation, replying to request for estimation, placing orders, delivery, giving instructions for trial manufacture and reporting the achievement of manufacture, as information about the progress management items in a progress attribute sections prepared for the parts in connection with the drawings, in addition to design data. The information abut the progress management items is extracted from standard electronic mails exchanged for communicating information relating to the development project between the members of the design department, the material procurement department and the manufacturing department, and is stored in the progress attribute section in which date indicating the progress of preparation of the component parts of the product configuration tree. For example, when an estimation request requesting the estimation of a part designed by the member of the design department is sent to the member of the material procurement department by a standard electronic mail 211, the standard electronic mail collecting unit 1402 collects the standard electronic mail. A method of collecting electronic mails will be concretely described later. Information 203 contained in the collected electronic mail 211 is monitored by the progress management information monitoring unit 1403, and the date of issuance of the electronic mail 211 is written in an estimation request section for the corresponding part in the progress management information storage unit 1404. When the member of the procurement department who received the estimation request sends a standard electronic mail 212 containing to reply to the estimation request, the progress management information monitoring unit 1403 monitors the electronic mail 212, and the date of issuance included in information 204 contained in the electronic mail 212 replying to the estimation request in an estimation reply section for the corresponding part in the progress management information storage unit 1404. Similarly to the aforesaid information, the dates of issuance of orders for the component members, delivery of the component members, issuance of instructions for trial manufacture and completion of trial manufacture are detected by monitoring pieces 205, 206, 207 and 208 of information contained in standard electronic mails 213, 214, 215 and 216, and the detected information is stored in relevant sections in the progress management information storage unit 1404.

Other information, such as conditions for estimation and estimates contained in the estimation replies, may be registered in addition to the dates, i.e., the progress management information, shown in FIG. 15. These pieces of information registered in addition to the dates are effective in grasping the contents of progress.

The foregoing procedure enables the members of the development project team to grasp the actual state of progress of development of the modules and the parts of the product to be developed, namely, 1) when the plotting work was started, 2) when the drawings were completed, 3) when estimation was requested, 4) when the estimation was given, 5) when orders were placed for materials, 6) when the materials were delivered, and 7) when an instruction to manufacture an experimental model was given and 8) when the experimental model was manufactured.

FIGS. 16(1) and 16(2) illustrate the progress management information stored in the progress management information storage unit 1404 to be displayed by the progress management information reference unit 1405. FIG. 16(1) is a representation in a tabular form and FIG. 16(2) is a representation in a graphic form.

In the tabular representation shown in FIG. 16(1), the names 1610 of the component parts of the objective product, and dates related with the progress management information, i.e., the dates 1611 of start of plotting to the dates 1618 of achievement of trial manufacture, and the present date or the date 1601 of updation of the progress management information, are displayed in a table on the screen 1600 of the output device of the development support system. Sections for pieces of the progress management information not yet started are left blank, and sections for pieces of the progress management information that have been started are filled with the dates of start.

In FIG. 16(1), the date 1603 of request for the estimation of the cost of a cabinet 1602, which is one of the component parts of the objective product, is January 15, and any reply 1064 to the estimation request has not yet been made. In FIG. 16(2) showing the pieces 1611 to 1618 of the progress management information in a graphic form, special marks 1621 to 1628 represented by colors, patterns or combinations of colors and patterns are assigned to the pieces 1611 to 1618 of the progress management information to indicate the completion of processes corresponding to the pieces 1611 to 1618 of the progress management information. The progress management items are the direct indices of the progress of tasks for the development of the product. For example, in FIG. 16(1), the determination of the date of every progress management item indicates one step of progress of the task for the development of the product. Hereinafter, a process corresponding to each progress management item will be referred to as a progress step.

Shown in a graphic form on the output screen 1600 are progress steps 1611 to 1618 (processes corresponding to the progress management items), the marks 1621 to 1628 respectively corresponding to the progress steps 1611 to 1618, and the conditions of progress of preparation of the modules and parts at the nodes of the product configuration tree, indicated by the marks. Data numerically indicating the condition of progress in FIG. 16(1) are indicated by the predetermined marks in FIG. 16(2). Although the representation in a graphic form is unable to indicate the dates exactly, the graphic representation has an advantage that the general condition of progress can be readily and visually recognized, for example, when the darkness of the color, i.e., the mark, is increased as the development activity progresses. Although the processes performed at the latest times are indicated in this embodiment, all the processes which have been performed up to the present may be indicated by marks.

Figure 17:
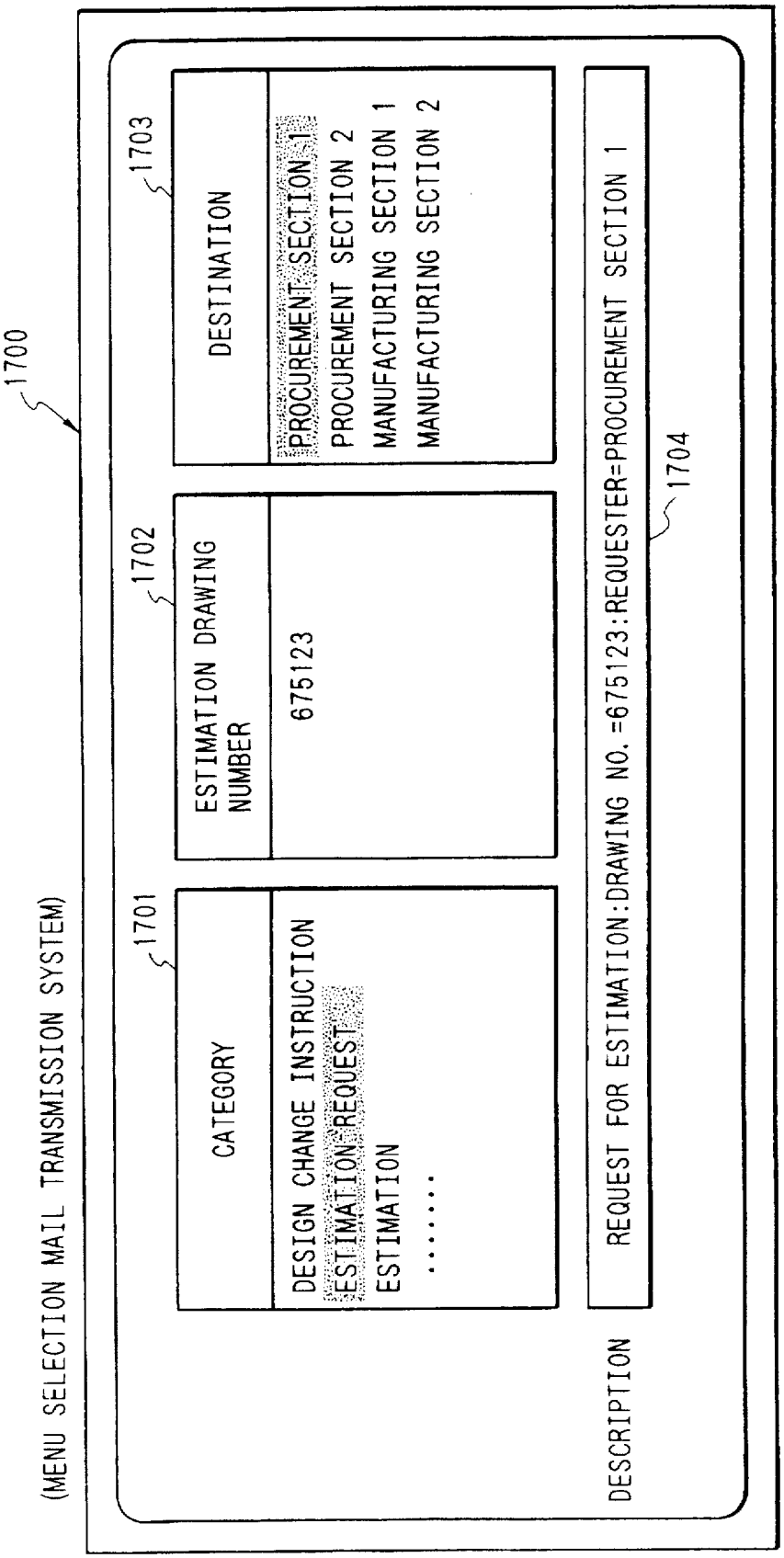
FIG. 17 is a picture displayed on a screen, for producing a standard electronic mail.
Figure 18:
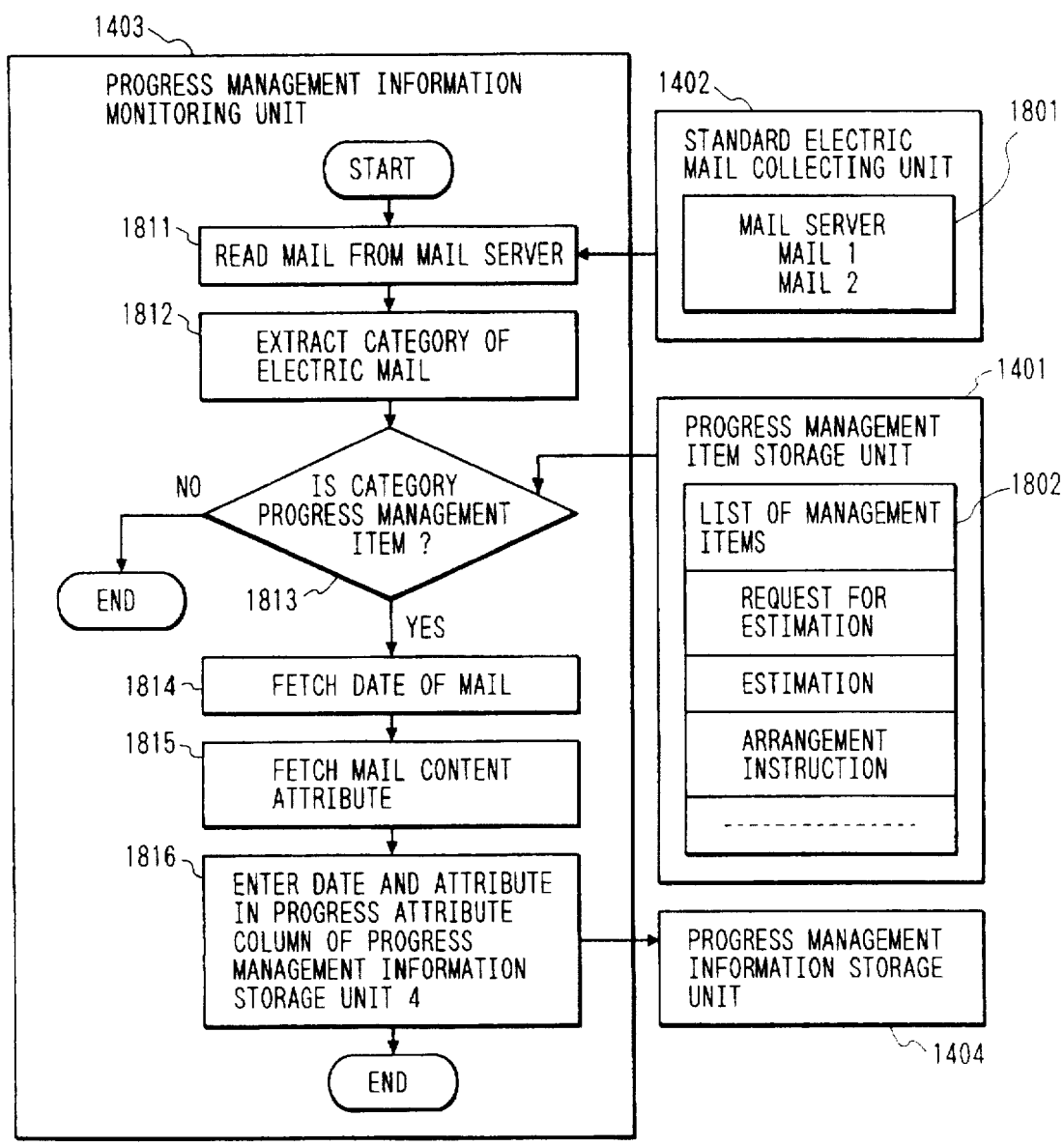
FIG. 18 is a flow chart of a procedure for monitoring the contents of an electronic mail and registering progress management information in a progress management information storage unit by a progress management information monitoring unit.
Figure 20:
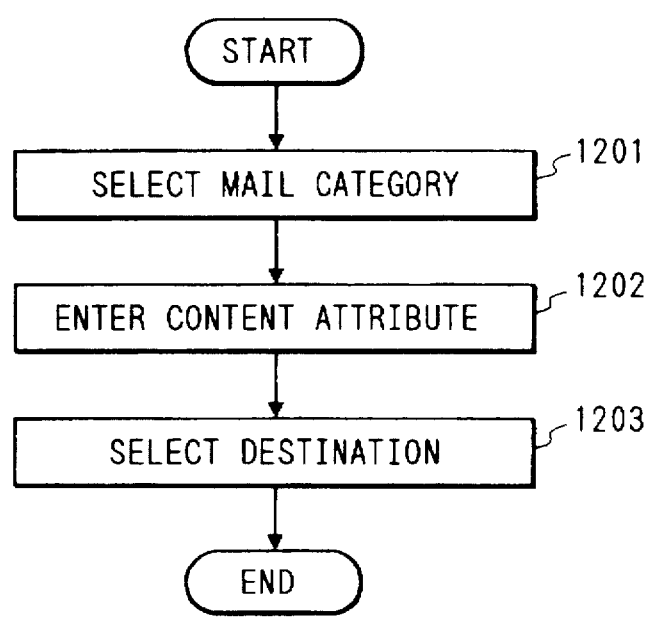
FIG. 20 is a flow chart of a standard electronic mail producing procedure.

The operation of the development support system in this embodiment will be described hereinafter with reference to FIGS. 17, 18, 19 and 20. The standard electronic mail collecting unit 1402 collects standard electronic mails exchanged between the departments concerned in the development project. As shown in FIG. 18, the standard electronic mail collecting unit 1402 has, for example, a mail server 1801 which collects and issues electronic mails. The contents of the standard electronic mail used in the development support system are formatted, for example, by category of the mail, date and content attribute as shown in FIG. 19. The categories of the mails correspond to the progress management items stored in the progress management item storage unit 1041 and the electronic mails include, for example, a estimation request mail 211, an estimation mail 212 and such. A date entered in a date section is the date of issuance of the electronic male. The content attributes indicate the attributes of the electronic mail; for example, the content attributes of the estimation request mail are an estimation request number and the estimated cost. The standard electronic mail can be produced and sent out by operating an electronic mail sending terminal provided with an operation screen 1700 as shown in FIG. 17 according to a flow chart shown in FIG. 20. When sending out an electronic mail, first the category of the electronic mail is selected from a menu 1701 in step 1201. Since the selectable categories of electronic mails correspond respectively to the progress management items stored in the progress management item storage unit 1401. For example, the categories of electronic mails as shown in FIG. 19 are choices. Then, the content attributes corresponding to the selected category of the electronic mail is entered in step 1202. In FIG. 17, a selected category of an electronic mail is "Estimation request", the content attribute "Estimation drawing number" corresponding to "Estimation request" is indicated in an input section 1702, and necessary information is entered. The content attribute entered in this step corresponds to the category of the electronic mail selected in the foregoing step and, concretely, one of the content attributes shown in a content attribute section in FIG. 19. Then, the destination of the electronic mail is selected from a menu 1703 in step 1203.

The destinations shall include at least the departments concerted with the development project. The electronic mail 1704 thus produced is issued after adding the date of issuance and information about the department to which the electronic mail is to be sent.

Although the electronic mail is produced and issued by specifying necessary items in the menus in this embodiment, there is no particular restriction on the method of producing the electronic mail and the devices for producing the same and any method and any devices may be used provided that the method and the devices are able to produce an electronic mail containing information as shown in FIG. 19 by way of example.

Standard electronic mails thus produced and issued by departments is collected temporarily as shown in FIG. 18 by the mail server 1801 of the standard electronic mail collecting unit 1402. Then, the progress management information monitoring unit 1403 selects the electronic mails containing information about the progress management items stored in the progress management item storage unit 1401, extracts the information from the selected electronic mails and stores the same in the progress management information storage unit 1404. More concretely, the progress management information monitoring unit 1403 executes a procedure represented by a flow chart shown in FIG. 18 to read the electronic mails from the mail server 1801 in step 1811, extracts the category of the read electronic mail in step 1812, and then, examines the extracted category in step 1813 to see whether or not the category corresponds to that of an electronic mail of a format including one of the progress management items 1802. If the extracted category does not correspond to that of an electronic mail of a format including one of the progress management items 1802, i.e., the response in step 1813 is negative, the procedure is ended. The procedure of the progress management information monitoring unit 1403 may execute the procedure every time a new electronic mail is received by the mail server 1801 or periodically. The progress management monitoring unit 1403 may be included in one of the destinations of electronic mails and electronic mails may be sent automatically and directly to the progress management information monitoring unit 1403 instead of sending the same through the standard electronic mail collecting unit 1402 to the progress management information monitoring unit 1403. The processing of the electronic mails by the progress management information monitoring unit 1403 can be realized by standardizing the format of messages contained in electronic mails by using the category of electronic mails, date and content attribute.

Figure 21:
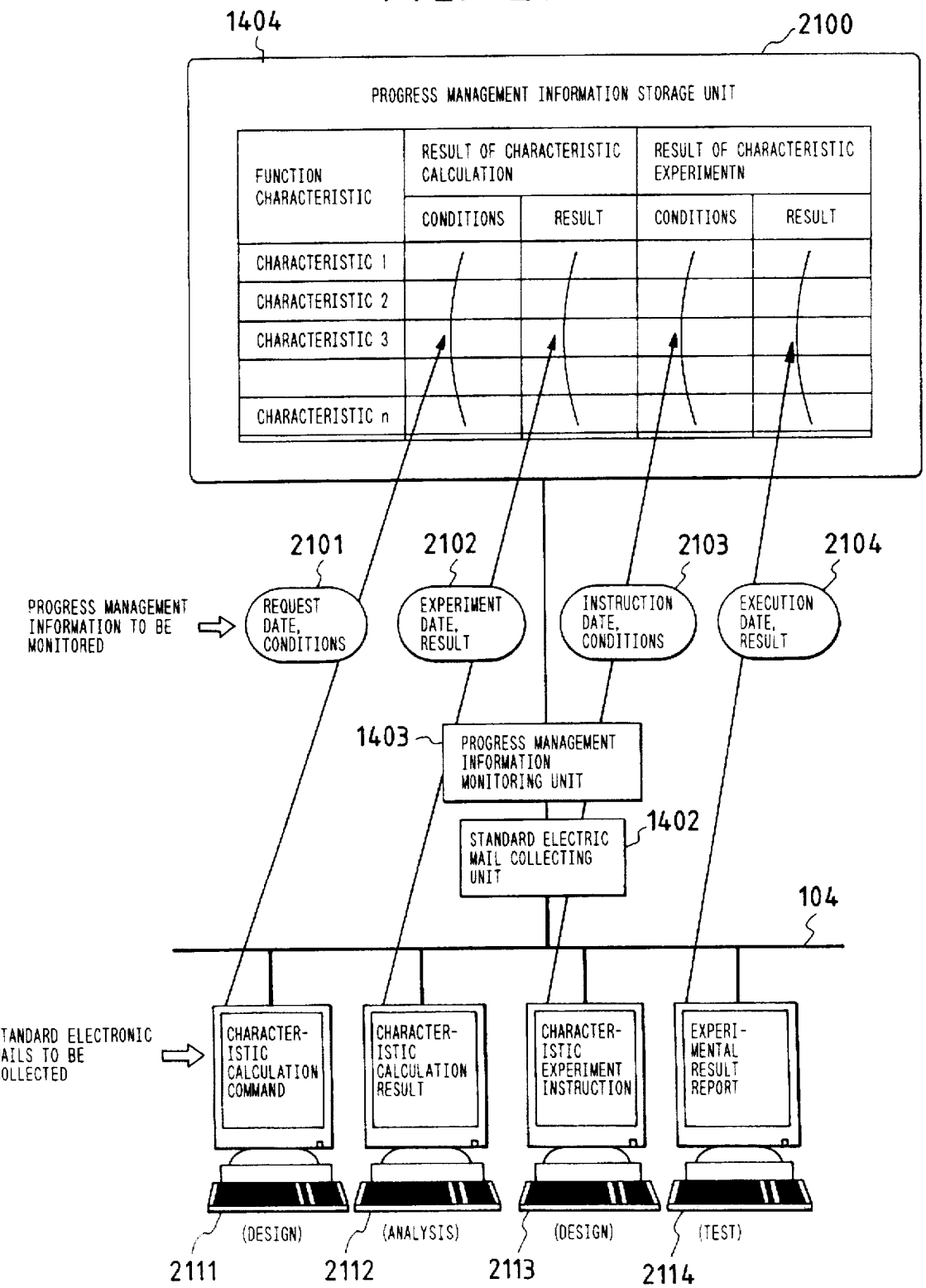
FIG. 21 is a block diagram of assistance in explaining a method of monitoring development progress using progress management information based on the function of the product.

The use of the information about the progress management items relating to the functions of the objective product will be concretely described hereinafter with reference to FIG. 21. Information about the calculated characteristics of the product or the parts and data obtained through experiments to indicate the progress of development of the functions of the product is stored in a function attribute section 2100 of the progress management information storage unit 1404 as a form of storing the progress management items. In some cases, the functional characteristics of the product are calculated several times under different calculating conditions by different calculating methods and the functional characteristics are studied through experiments under different experimental conditions and using different experimental models, when developing the product. In most cases, the calculation of the functional characteristics and the experiments on the same are predetermined for the category of the product. Accordingly, the degree of achievement of the functions of the product, namely, degree of progress of the development project in respect to the functional aspect of the product, can be known by monitoring the processes of calculations and experiments. Therefore, the function attribute section 2100 in which the results of calculation of the characteristics and the experimental results are entered has a form that allows recording the experimental results of the functional characteristics obtained through a plurality of times of experiments.

The contents of the information to be stored in the functional attribute section 2100 are extracted from standard electronic mails exchanged for communication between the members of the design department, the analysis department, testing department and such, and the extracted information is written in the functional attribute section 2100. For example, when a request to a member of the analysis department is made for calculating the functional characteristics of a part designed by a member of the design department by means of a standard electronic mail 2111, the standard electronic mail collecting unit 1402 collects the standard electronic mail 2111. The progress management information monitoring unit 1403 monitors the information 2101 contained in the collected electronic mail 2111 and stores the calculating conditions specified in the electronic mail 2111 in a calculating condition space for the objective function of the progress management information storage unit 1404. The member of the analysis department who has received the electronic mail 2111 requesting characteristic calculation sends out an electronic mail 2112 containing the results of characteristic calculation. Then, the progress management information monitoring unit 1403 monitors the electronic mail 2112 and stores the results of calculation included in the information 2102 contained in the electronic mail 2112 in a characteristic calculation result section of the progress management information storage unit 1404. The dates of execution of the calculation of the characteristics of the product or the part and experiments on the same, and the results of calculation and experiments can be known by making reference to the function attribute section 2100 into which the information has been entered.

A development progress monitoring system in another embodiment according to the present invention will be described hereinafter with reference to FIG. 22. This embodiment uses information about calculation instructions given to computers for calculating the functional characteristics of the objective product for monitoring the condition of progress of development activities concerning the functions of the objective product.

Figure 22:
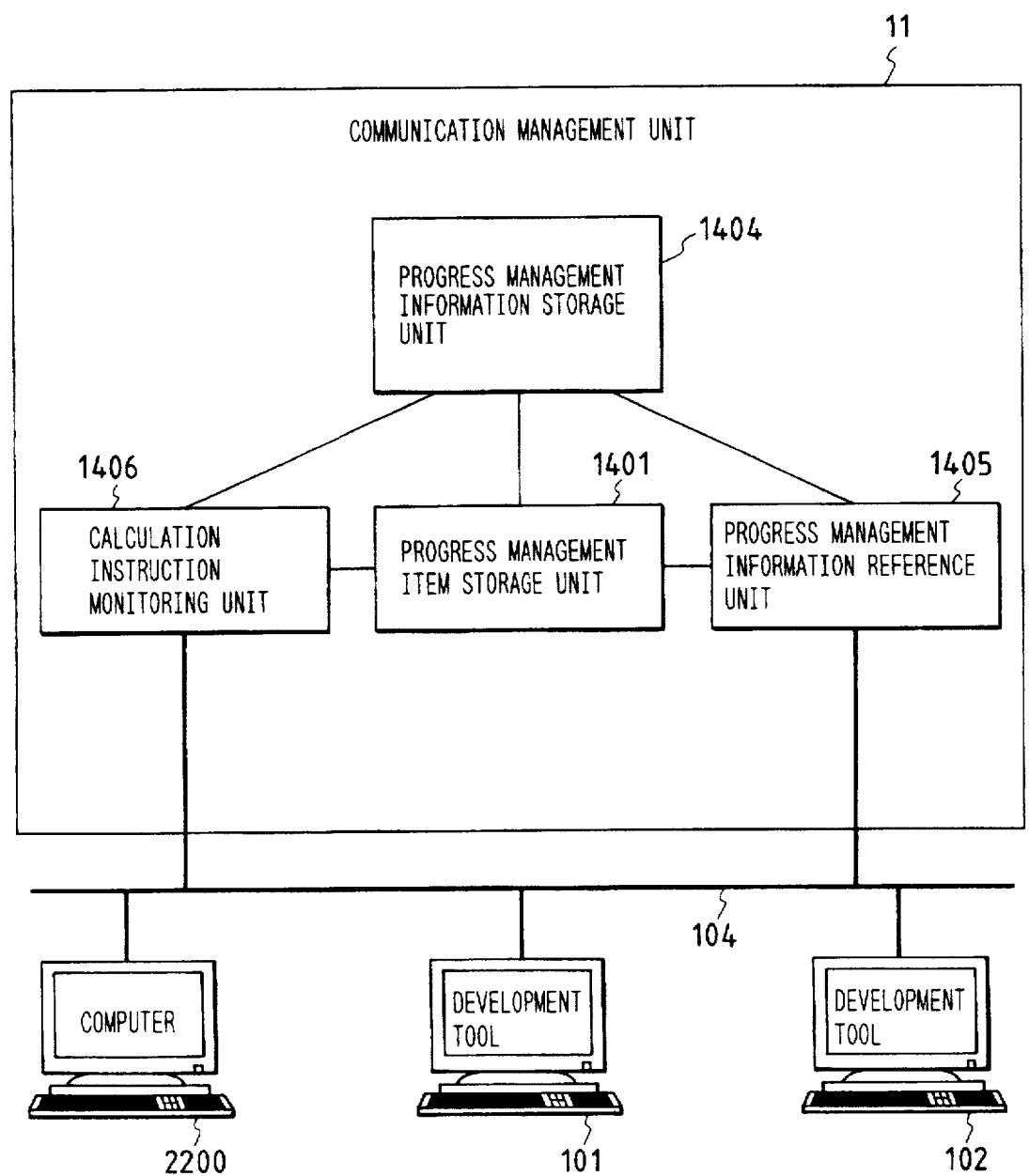
FIG. 22 is a block diagram of a development progress monitoring system in another embodiment according to the present invention.

Referring to FIG. 22, a communication management unit 11 monitors information about calculation instructions sent from development tools 101, 102, . . . to a computer 2200 through a information network 104 to which the development tools 101, 102, . . . and the computer 2200 are connected. The development progress monitoring system comprises a progress management item storage unit 1401 for storing predetermined progress management items serving as indices for progress management, a calculation instruction monitoring unit 1406 for extracting information about the progress management items included in calculation instructions to be sent to the computer 2200, a progress management information storage unit 1404 for storing the extracted information as progress management information; a progress management information reference unit 1405 for referring to the progress management information stored in the progress management information storage unit 1404, and an input/output unit, not shown, subject to external operations for displaying the results of processing.

The progress management items stored in the progress management item storage unit 1401 are, for example, may be instructions for the calculation of the estimated costs and the functional characteristics of the product or the component parts of the product to be carried out by the computer 2200. Although the foregoing embodiment monitors the contents of the electronic mails exchanged for communication between the members of the development project team, this embodiment monitors the calculation instructions given to the computer 2200 by the members concerned. This embodiment is not provided with any units corresponding to the standard electronic mail collecting unit 1402 and the progress management information monitoring unit 1403 of the previously described embodiment, and is provided with the calculation instruction monitoring unit 1406 instead. The contents of the monitored calculation instructions are examined to see whether or not the the contents correspond to the progress management items stored in the progress management item storage unit 1401 by a procedure similar to that employed in the previously described embodiment shown in FIG. 18. If the contents correspond to the progress management items, the contents are stored in the progress management information storage unit 1404.

Since electronic mails are not collected and not monitored and hence the development progress monitoring system need not be provided with any electronic mail collecting unit, the development progress monitoring system has a simple configuration and is capable of grasping the condition of progress of development activities for developing the functional characteristics of the product.

A development progress management system embodying the present invention will be described hereinafter with reference to FIG. 23. The development progress management process in this embodiment stores estimated dates of completion of processes corresponding to progress management items in a progress management information storage unit 1404, compares the estimated dates of completion and the actual state of the processes, displays the results of comparison, and indicates the progress management items behind the schedules.

Figure 23:
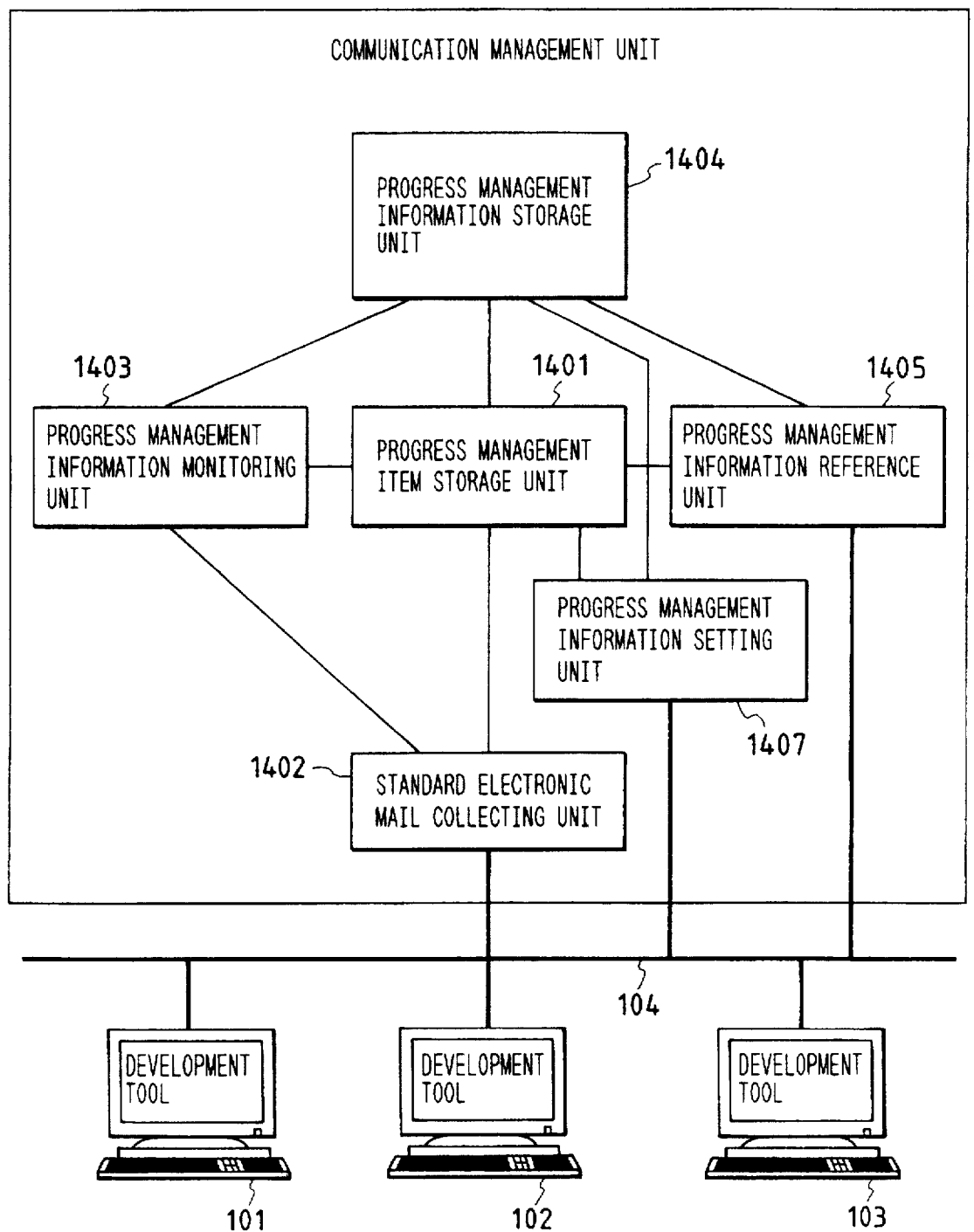
FIG. 23 is a block diagram of a development progress monitoring system in a further embodiment according to the present invention.

Referring to FIG. 23, the development management system comprises a progress management item storage unit 1401 for storing progress management items serving as indices of scheduled progress, a standard electronic mail collecting unit 1402 for collecting standard electronic mails exchanged between the departments concerning the development project, a progress management information monitoring unit 1403 for extracting information about the progress management items contained in the collected electronic mails, a progress management information storage unit 1404 for storing the extracted information as progress management information, a progress management reference unit 1405 for referring to the progress management information stored in the progress management information storage unit 1404, an input/output unit subject to external operations for displaying the results of tasks, and a progress management information setting unit 1407 for setting estimated dates of completion of tasks corresponding to the progress management items. These components other than the progress management information setting unit 1407 are the same in configuration and function as those shown in FIG. 14 and hence the description thereof will be omitted.

Referring to FIG. 24, the progress management information setting unit 1407 sets estimated dates of completion of tasks corresponding to the progress management items through the screen 1600 of an output device included in the input/output unit. An estimated date setting process to be carried out by the progress management information setting unit 1407 is started by clicking a schedule setting button 2401 displayed on the screen 1600 by operating an input device, such as a mouse or a keyboard. FIG. 24 shows the screen 1600 in a state where the schedule setting process has been selected. Names 1610 of the component parts of the objective product, the dates 1611 to 1618 of starting and completing tasks corresponding to the progress management items are displayed in a table on the screen 1600 for schedule setting. For example, the operator specifies a space in which an estimated date is to be entered on the screen 1600 by operating a mouse or the like, and enters a date in the specified space by operating a keyboard. The progress management information setting unit 1407 accepts instructions provided by the operator and sets estimated dates for tasks corresponding to the progress management items for the parts. Standard times necessary for completing tasks, respectively, may be predetermined, and the estimated dates of completion of tasks other than a task entered first in the table may be automatically determined.

Figure 25:
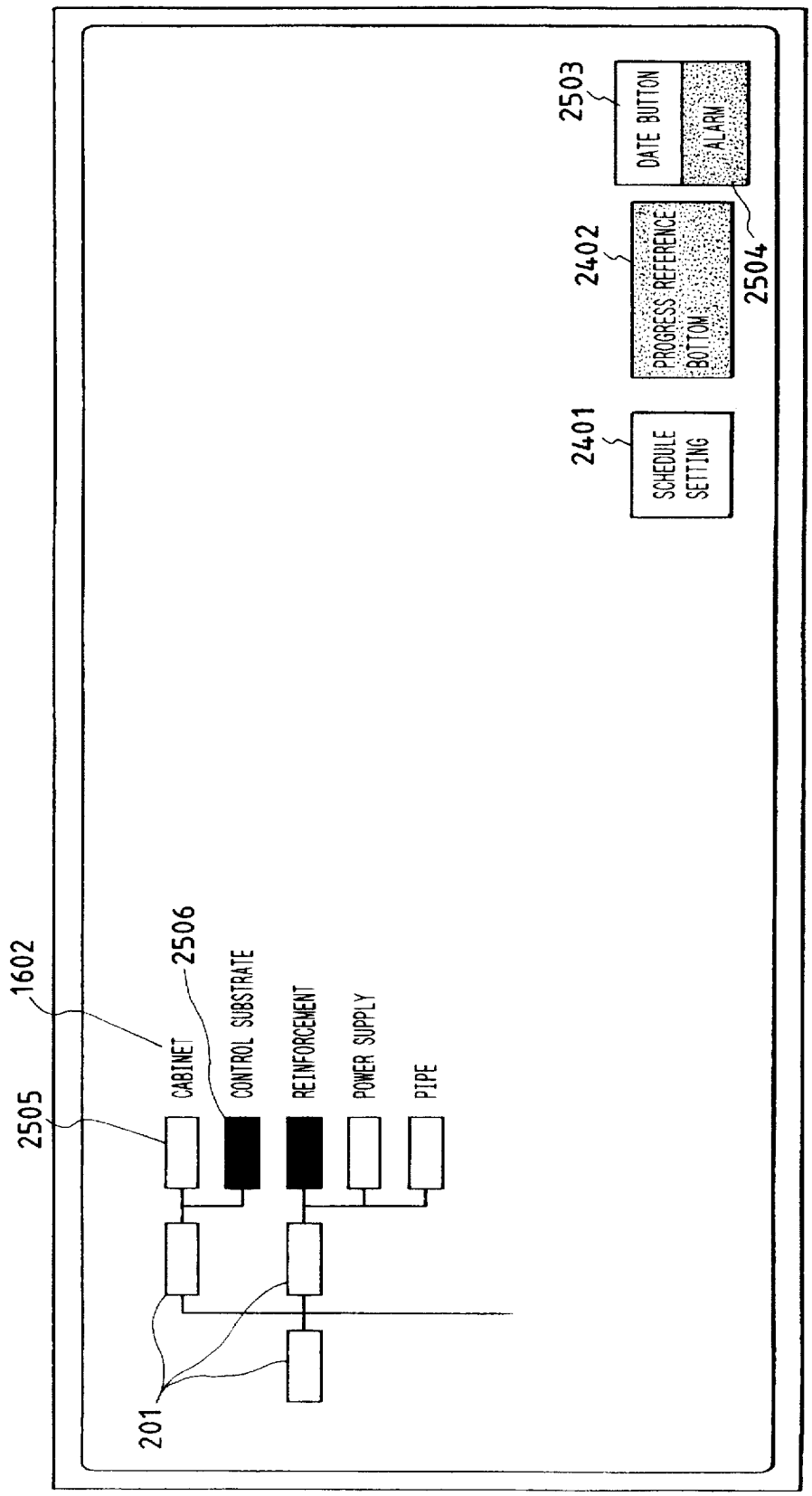
FIGS. 25(1) and 25(2) are a table and a graphic representation displayed on screens, respectively, showing the schedules and the actual conditions of progress of tasks.

After the estimated dates have been set by the progress management information setting unit 1407, the progress management information reference unit 1405 is started to display comparatively both the estimated dates of completion of the tasks corresponding to the progress management items and actual dates of completion stored in the progress management information storage unit 1404 to enable the comparison of the estimated progress and the actual progress of the tasks. The displaying operation of the progress management information reference unit 1405 can be started by clicking a progress reference button 2402 provided on the screen 1600 for setting estimated dates shown in FIG. 24. The information may be displayed on the screen in either a tabular form numerically showing both the estimated dates and the actual dates in combination as shown in FIG. 25(1) or a graphic form indicating the actual progress of the tasks by predetermined marks as shown in FIG. 25(2). Either the tabular form of FIG. 25(1) or the graphic form of FIG. 25(2) can be selected by clicking either of a date button 2503 and an alarm button 2504 which are displayed on the screen 1600 when a progress reference button 2402 displayed on the screen 1600 is clicked. When the tabular form is selected, the estimated dates 1101 of completion and actual dates of completion of processes 1611 to 1618 for the progress management items are displayed in combination as shown in FIG. 25(1). When the graphic form is selected, processes corresponding to the progress management items behind the schedules and processes corresponding to progress management items in accordance with the schedules are marked with marks 2505 and 2506 different from each other in color or shape so that those processes can be clearly identified. The graphic form of representation of the information by this embodiment, and the representation with color marks or pattern marks assigned to the progress management items as shown in FIG. 16(2) may be used in combination to specify the processes behind the schedules concretely. Since the estimated completion dates set for the processes corresponding to the progress management items and the corresponding actual dates of completion can be compared, the condition of progress of the development project can be more exactly recognized.

Figure 26:
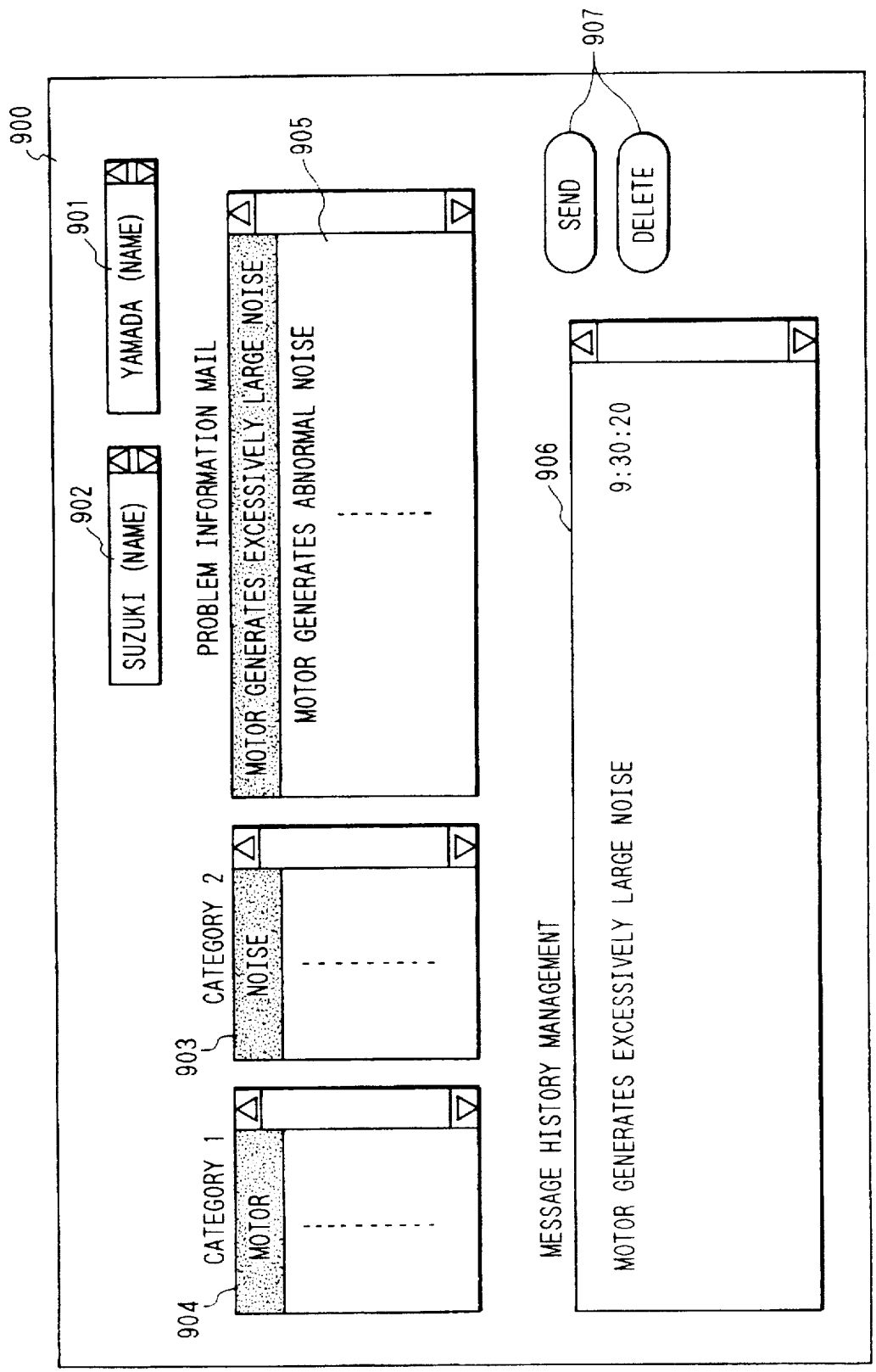
FIG. 26 is a communication electronic mail for communicating problems detected during tests, displayed on a screen.

Communication between the design department and the testing department to deal with problems will be described hereinafter with reference to FIG. 26. When a problem arises during tests, the testing department must inform a relevant department of the problem. Suppose that the relevant department is a mechanical design department. Then, the testing department must inform the mechanical design department immediately of information about the contents of the problem that arose during tests. The testing department sends an communication mail containing the information about the contents of the problem through the communication management unit 11 to the mechanical design department, because the information cannot be immediately given to the relevant member of the mechanical design department by telephone if the relevant member is away from his or her desk. Referring to FIG. 26 illustrating, by way of example, a problem communication mail picture 900 displayed on a screen and showing the contents of information about a problem that arose during tests to be sent out from the testing department, the problem communication mail picture 900 has a tester specifying space 901 in which the name of a tester, i.e., the sender, is entered, and a designer specifying space 902 in which the name of a relevant designer, i.e., the destination, is entered. Suppose that a problem "The motor generates excessively large noise." has arose during tests. Then, the tester sends out a problem communication mail immediately by the following procedure. First "Motor" is selected from a list 904 of category 1 mainly including names of places and parts, and then a list 903 of category 2 including categories of measurements having connection with the place or the parts selected from the list 904 of category 1 is displayed. If "Sound" is selected from the list 903 of category 2, a list 905 of messages having connection with sounds is displayed. Then, a message "The motor generates excessively large noise." is selected and a sending button is depressed. Consequently, the communication management unit 11 stores the problem communication mail in a problem history storage unit 151 included in a communication storage unit 15 and informs the design department of the arrival of a new problem communication mail. The message sent out from the testing department and the message sending time are displayed in a message history management space 906. The message sent out from the testing department can be deleted from the history and the problem communication mail which has been sent out can be cancelled by depressing a delete button.

Figure 28:
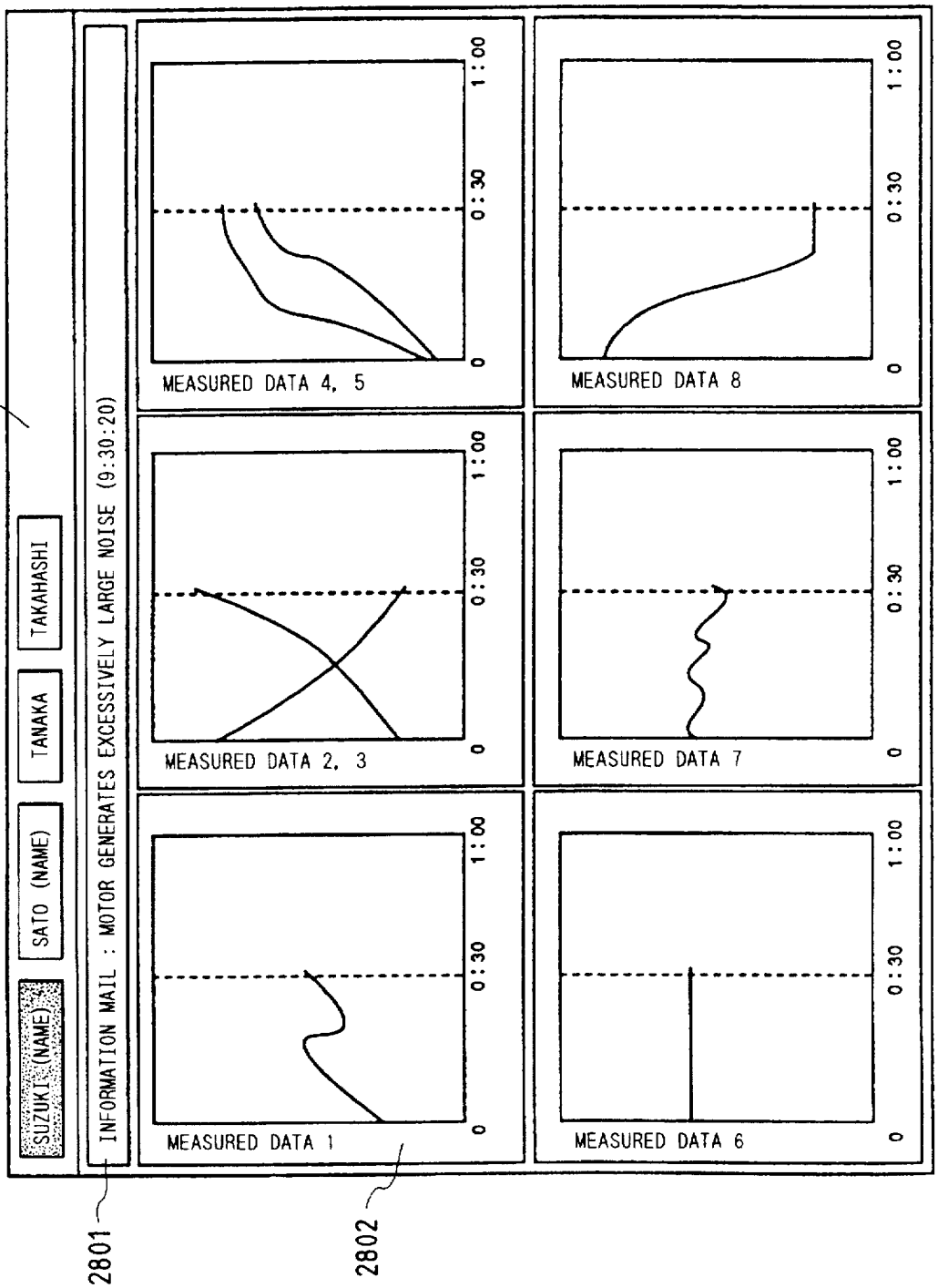
FIG. 28 is an electronic mail for communication showing measured data for reference during tests, displayed on a screen.

A procedure for handing the problem communication mail by the design department will be described hereinafter with reference to FIGS. 27 and 28. The name of the relevant machine designer displayed in a name section 2702 blinks in red. Data shown in the name section 2702 particularizes the classification of the receivers, i.e., the machine design department, the electrical design department, the experimental model manufacturing department and the testing department. In FIG. 27, the problem communication mail is addressed to "Suzuki". The name of the test laboratory is shown in a test laboratory space 2702, test conditions for a test item in which the problem arose are shown in a condition space 2703, and the message contained in the problem communication mail is shown in a message space 2704. Since the measured data obtained through tests is stored beforehand in the communication storage unit 15 by the communication management unit 11, the measured data can be displayed on the screen by connecting the problem communication mail with the measured date. FIG. 28 shows the measured data displayed for the relevant machine designer. Graphs of the measured data as shown in FIG. 28 can be displayed by selecting the problem communication mail in FIG. 27. These graphs of the measured data are formed by plotting the measured data of relevant measuring items included in a table shown in FIG. 29 describing the relation between the names of measurements and the problem communication mail. In FIG. 29, measured data concerned with the message contained in the problem communication mail, such as "The motor generates large noise." are listed in a measuring item space 2902.

When a problem arises, it is thus unnecessary consider to which measured data reference should be made to look into the causes of the problem when the table showing the categories of problems in connection with the corresponding measuring items is used and, therefore, work on looking into the causes of the problem can be very efficiently carried out. Since the measured data can be obtained in a real time mode, measures for solving the problem can be promptly conceived and taken.

As is apparent from the foregoing description, the present invention provides a development support system capable of supporting the management of coordinating the general target value and the individual target values for the new product development project and estimated values.

According to the present invention, electronic mails used by the members of the development project team for processing essential tasks assigned to the members are monitored automatically, information about the progress of the new product development project is extracted automatically from the electronic mails, and the extracted information is stored automatically as progress management information so that the members of the development project team are able to recognize the general progress of the new product development project. The information about the monitored progress management items are obtained not by exchanging electronic mails for development management.

The present invention solves the problem in the conventional development support system that special work for development management is necessary and the management of the development project is a burden on the members participating in the development project.

Further, the present invention solves the problem in the conventional development support system that it is difficult to collect objective information for development management. Since development activities themselves are intellectual activities of human, the information about the condition of progress of the development project have been obtained from personal reports given by the members of the development project team because development activities themselves are intellectual activities of human, whereas the progress of production activities can be objectively and readily recognized because it is possible to recognize visually a stage of process in which the product is, which is the point where the progress management of development activities and that of production activities differ from each other.

The conventional development support systems used mainly subjective information given personally by the members of the development project for management and therefore it was difficult for the conventional development support systems to collect objective information about the progress of the development project. Consequently, there was a problem in such systems even if they had advanced managing functions is unable to carry out effective, objective development project management. Since the present invention obtains the information about the condition of progress of the development project not from the personal reports of the members of the development project team, but by automatically monitoring information about processes of tasks essential to carrying out the development project, the information represents the actual condition of progress of the development project exactly. Thus, the capability of the present invention of obtaining important, objective information about the progress of the development project solves the most significant problem in the conventional development support system.

What is claimed is:

1. A development support system for supporting product development activities of a plurality of members participating in a product development project for developing a new product, comprising:

model storage means for storing product models, resource models to be used for product development, and product development activity models;

target storage means for storing general and individual target values for the cost and the performance of said product, and development schedules;

estimating means for estimating the cost, the performance, and the progress of development schedules on the basis of models stored in the model storage means;

reference support means for supporting members of a development project team to make reference to the stored models and target values and the estimated data of progress;

model change and particularization support means for supporting the members of the development project team for operations to change and particularize the stored models; and notifying means for deciding whether or not the estimated data of progress meet the corresponding target values when the models are changed or particularized and, at least when the estimated data of progress do not meet the corresponding target values, notifying the members to the effect that the estimated data of progress do not meet the corresponding target values, wherein each product development activity model is a graphic representation describing, in connection with a precedence relation between development activity units, a name for each development activity unit, restrictions on each development activity unit, the resource models to be used by each development activity unit, the product models to which each development activity unit makes reference, and product models showing the results of each development activity unit.

2. A development support system according to claim 1, wherein each activity unit of the development activity models is provided with identification codes identifying a chief member of the activity unit.

3. A development support system for supporting product development activities of a plurality of members participating in a product development project for developing a new product, comprising:

model storage means for storing product models, resource models to be used for product development, and product development activity models;

target storage means for storing general and individual target values for the cost and the performance of said product, and development schedules;

estimating means for estimating the cost, the performance, and the progress of development schedules on the basis of models stored in the model storage means;

reference support means for supporting members of a development project team to make reference to the stored models and target values and the estimated data of progress;

model change and particularization support means for supporting the members of the development project team for operations to change and particularize the stored models;

notifying means for deciding whether or not the estimated data of progress meet the corresponding target values when the models are changed or particularized and, at least when the estimated data of progress do not meet the corresponding target values, a progress management item storage unit for storing progress management items serving as indices indicating the progress of development of the product;

a progress management information monitoring unit for extracting information about progress management items serving as indices indicating progress of development of the product from electrical information sent through development information networks by the plurality of members of the product development project team;

a progress management information storage unit for storing the extracted information extracted by the progress management information monitoring unit as progress management information; and a progress management information reference unit for enabling the members of the development project team to make reference to progress management information stored in the progress management information storage unit.

4. A development support system according to claim 3, wherein pieces of the electrical information are exchanged by electronic mail between the members of the development project team to process a plurality of tasks relating to development of the product, and the progress management information monitoring unit extracts pieces of information concerning the progress management items from electronic mail and stores the extracted pieces of information as the progress management information in the progress management information storage unit.

5. A development support system according to claim 4, wherein the electronic mail is used to perform at least one of processes of making a request for the estimation of the cost of each component part of the product, replying to a request for of the cost of each component part of the product, giving an instruction to place an order for a component part, reporting delivery of an ordered component part, giving an instruction to manufacture an experimental model, and reporting a delivery of an experimental model, the progress management item storage unit stores a date of completion of a process, which is one of the processes performed by using the electronic mail, as the progress management item, and the progress management information monitoring unit extracts a date of completion of a process performed by using electronic mail from electronic mail, and stores the extracted date of completion as progress management information in the progress management information storage unit.

6. A development support system according to claim 3, wherein the progress management information reference unit is provided with an indicating means for indicating at least one of the progress management items corresponding to progress management information stored in the progress management information storage unit with a mark assigned beforehand to the progress management item.

7. A development support system according to claim 6, wherein the indicating means indicates a progress management item corresponding to one of the pieces of the latest progress management information stored in the progress management information storage unit for each of the component parts of the product by a mark assigned beforehand to the progress management item.

8. A development support system according to claim 3 further comprising a progress management information setting unit for setting an estimated date of completion of at least one of the progress management items stored in the progress management item storage unit;

wherein the progress management information reference unit has an indicating means for indicating either a set estimated date of completion or a date of completion included in the progress management information or both a set estimated date and a date of completion included in progress management information, for a progress management item for which an estimated date of completion is set among progress management items corresponding to progress management information stored in the progress management information storage unit.

9. A development support system according to claim 3 further comprising a progress management information setting unit for setting a estimated date of completion for at least one of the progress management items stored in the progress management item storage unit;

wherein the progress management reference unit has indicating means for discriminatingly indicating a progress management item, the date of completion of which is behind the estimated date of completion of the same, and a progress management item, the date of completion of which is not behind the estimated date of completion of the same, among progress management items corresponding to progress management information stored in the progress management information storage unit.

10. A development support system according to claim 3, wherein the progress management item storage unit stores, as progress management items, predetermined items relating to at least one of the processes of giving an instruction to calculate functional characteristics of the product or component parts thereof, reporting the results of a directed calculation, giving an instruction to perform experiments on functional characteristics and reporting results of directed experiments.

11. A development support system for supporting product development activities of a plurality of members participating in a product development project for developing a new product, comprising:

model storage means for storing product models, resource models to be used for product development, and product development activity models;

target storage means for storing general and individual target values for the cost and the Performance of said product, and development schedules;

estimating means for estimating the cost, the performance, and the progress of development schedules on the basis of models stored in the model storage means;

reference support means for supporting members of a development project team to make reference to the stored models and target values and the estimated data of progress;

model chance and particularization support means for supporting the members of the development Project team for operations to change and particularize the stored models;

notifying means for deciding whether or not the estimated data of progress meet the corresponding target values when the models are changed or particularized and, at least when the estimated data of progress do not meet the corresponding target values, notifying the members to the effect that the estimated data of progress do not meet the corresponding target values, a progress management item storage unit for providing a plurality of items corresponding to a plurality of calculation processes and storing at least one of the plurality of items as a management item relating to development of the product, to monitor and extract automatically product development activity models, a cost and a performance of the product and target development schedules among the contents of electronic communications exchanged between the plurality of members of the development project team;

a progress management information monitoring unit for extracting information about management items from information included in at least a calculation process instruction given to a predetermined computer for each of a plurality of calculation processes or an output of the predetermined computer;

a progress management information storage unit for storing extracted information; and a progress management information reference unit for making reference to information stored in the progress management information storage unit.

12. A development support system for supporting product development activities of a plurality of members of a development project team, comprising:

model storage means for storing product models, resource models to be used for product development, and product development activity models;

target storage means for storing general and individual target values for the cost and the performance of said product, and development schedules;

estimating means for estimating the cost, the performance, and the progress of development schedules on the basis of models stored in the model storage means;

reference support means for supporting members of the development project team to make reference to the stored models and target values and the estimated data of progress;

model change and particularization support means for supporting the members of the development project team for operations to change and particularize the stored models;

target change and particularization support means for supporting the members of the development project team for operations to change and particularize the target values; and notifying means for evaluating the consistency of the general target value and the individual target values with each other when the target values are changed or particularized and, at least when the general target value and the individual target values are inconsistent with each other, notifying the members to that effect, wherein each product development activity model is a graphic representation describing, in connection with a precedence relation between development activity units, a name for each development activity unit, restrictions on each development activity unit, the resource models to be used by each development activity unit, the product models to which each development activity unit makes reference, and product models showing the results of each development activity unit.

13. A development support system according to claim 12, wherein each activity unit of the development activity models is provided with identification codes identifying a chief member of the activity unit.

14. A development support system for supporting product development activities of a plurality of members of a development project team, comprising:

model storage means for storing product models, resource models to be used for product development, and product development activity models;

target storage means for storing general and individual target values for the cost and the performance of said product, and development schedules;

estimating means for estimating the cost, the performance, and the progress of development schedules on the basis of models stored in the model storage means;

reference support means for supporting members of the development project team to make reference to the stored models and target values and the estimated data of progress;

model change and particularization support means for supporting the members of the development project team for operations to change and particularize the stored models;

target change and particularization support means for supporting the members of the development project team for operations to change and particularize the target values; and notifying means for evaluating the consistency of the general target value and the individual target values with each other when the target values are changed or particularized and, at least when the general target value and the individual target values are inconsistent with each other, notifying the members to that effect;

a progress management item storage unit for storing progress management items serving as indices indicating the progress of development of the product;

a progress management information monitoring unit for extracting information about progress management items serving as indices indicating progress of development of the product from electrical information sent through development information networks by the plurality of members of the product development project team;

a progress management information storage unit for storing the extracted information extracted by the progress management information monitoring unit as progress management information; and a progress management information reference unit for enabling the members of the development project team to make reference to progress management information stored in the progress management information storage unit.

15. A development support system according to claim 14, wherein pieces of the electrical information are exchanged by electronic mail between the members of the development project team to process a plurality of tasks relating to development of the product, and the progress management information monitoring unit extracts pieces of information concerning the progress management items from electronic mail and stores the extracted pieces of information as the progress management information in the progress management information storage unit.

16. A development support system according to claim 15, wherein the electronic mail is used to perform at least one of processes of making a request for the estimation of the cost of each component part of the product, replying to a request for estimation of the cost of each component part of the product, giving an instruction to place an order for a component part, reporting delivery of an ordered component part, giving an instruction to manufacture an experimental model, and reporting a delivery of an experimental model, the progress management item storage unit stores a date of completion of a process, which is one of the processes performed by using the electronic mail, as the progress management item, and the progress management information monitoring unit extracts a date of completion of a process performed by using electronic mail from electronic mail, and stores the extracted date of completion as progress management information in the progress management information storage unit.

17. A development support system according to claim 14, wherein, the progress management information reference unit is provided with an indicating means for indicating at least one of the progress management items corresponding to progress management information stored in the progress management information storage unit with a mark assigned beforehand to the progress management item.

18. A development support system according to claim 17, wherein the indicating means indicates a progress management item corresponding to one of the pieces of the latest progress management information stored in the progress management information storage unit for each of the component parts of the product by a mark assigned beforehand to the progress management item.

19. A development support system according to claim 14, further comprising: a progress management information setting unit for setting an estimated date of completion of at least one of the progress management items stored in the progress management item storage unit, said progress management information reference unit having an indicating means for indicating either a set estimated date of completion or a date of completion included in the progress management information, or both a set estimated date and a date of completion included in progress management information, for a progress management item for which an estimated date of completion is set among progress management items corresponding to progress management information stored in the progress management information storage unit.

20. A development support system according to claim 14, further comprising: a progress management information setting unit for setting an estimated date of completion for at least one of the progress management items stored in the progress management item storage unit;

wherein the progress management reference unit has indicating means for discriminatingly indicating a progress management item, the data of completion of which is behind the estimated date of completion of the same, and a progress management item, the date of completion of which is not behind the estimated date of completion of the same, among progress management items corresponding to progress management information stored in the progress management information storage unit.

21. A development support system according to claim 14, wherein the progress management item storage unit stores, as progress management items, predetermined items relating to at least one of the processes of giving an instruction to calculate functional characteristics of the product or component parts thereof, reporting the results of a directed calculation, giving an instruction to perform experiments on functional characteristics and reporting results of directed experiments.

22. A development support system for supporting product development activities of a plurality of members of a development project team, comprising:

model storage means for storing product models, resource models to be used for product development, and product development activity models;

target storage means for storing general and individual target values for the cost and the performance of said product, and development schedules;

estimating means for estimating the cost, the performance, and the progress of development schedules on the basis of models stored in the model storage means;

reference support means for supporting members of the development project team to make reference to the stored models and target values and the estimated data of progress;

model change and particularization support means for supporting the members of the development project team for operations to change and particularize the stored models;

target change and particularization support means for supporting the members of the development project team for operations to change and particularize the target values; and notifying means for evaluating the consistency of the general target value and the individual target values with each other when the target values are changed or particularized and, at least when the general target value and the individual target values are inconsistent with each other, notifying the members to that effect, a progress management item storage unit for providing a plurality of items corresponding to a plurality of calculation processes and storing at least one of the plurality of items as a management item relating to development of the product, to monitor and extract automatically product development activity models, a cost and a performance of the product and target development schedules among the contents of electronic communications exchanged between the plurality of members of the development project team;

a progress management information monitoring unit for extracting information about management items from information included in at least a calculation process instruction given to a predetermined computer for each of a plurality of calculation processes or an output of the predetermined computer;

a progress management information storage unit for storing extracted information; and a progress management information reference unit for making reference to information stored in the progress management information storage unit.

23. A development support system comprising:

a plurality of terminals; and analysis equipment connected to said plurality of terminals, said analysis equipment having first storage means for storing work information of a product output from said plurality of terminals, second storage means for storing of target values for at least one cost and development schedules of the product, estimating means for estimating at least one of cost and development schedules of the product based on the work information, judging means for judging whether or not the at least one of estimated cost and development schedules of the product estimated by said estimating means meet, respectively, said target values for at least one of the cost and development schedules of the product, and notifying means for notifying the terminals when at least one of the estimated cost and development schedules does not meet, respectively, said target values for at least one of the cost and development schedules of the product.

24. A development support system according to claim 23, wherein said work information is a work quantity about a changed part of the product, and said estimating means estimates the development schedules of the product based on the work quantity.

25. A development support system according to claim 23, wherein said work information includes information concerning components about a changed part of the product, and said estimating means estimates the cost of the product based on the components.

* * * * *